(12) United States Patent
Seguchi et al.

(10) Patent No.: US 11,390,770 B2
(45) Date of Patent: Jul. 19, 2022

(54) INK JET RECORDING METHOD, INK JET RECORDING APPARATUS, AND INK SET

(71) Applicant: Seiko Epson Corporation, Tokyo (JP)

(72) Inventors: Kenichi Seguchi, Okaya (JP); Mitsuaki Kosaka, Minowa (JP)

(73) Assignee: Seiko Epson Corporation

( * ) Notice: Subject to any disclaimer, the term of this patent is extended or adjusted under 35 U.S.C. 154(b) by 42 days.

(21) Appl. No.: 17/002,859

(22) Filed: Aug. 26, 2020

(65) Prior Publication Data

US 2021/0062029 A1 Mar. 4, 2021

(30) Foreign Application Priority Data

Aug. 27, 2019 (JP) .............................. JP2019-154435

(51) Int. Cl.
*C09D 11/54* (2014.01)
*C09D 11/38* (2014.01)
(Continued)

(52) U.S. Cl.
CPC .................. *C09D 11/54* (2013.01); *B41J 2/01* (2013.01); *B41J 2/2107* (2013.01); *B41J 2/2114* (2013.01);
(Continued)

(58) Field of Classification Search
CPC ... C09D 11/107; C09D 11/322; C09D 11/101; C09D 11/326; C09D 11/38; C09D 11/36; C09D 11/40; C09D 11/30; C09D 11/32; C09D 11/324; C09D 11/328; C09D 11/102; C09D 11/005; C09D 11/54; C09D 11/52; C09D 11/106; C09D 11/03; C09D 11/037; C09D 11/033; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201;
(Continued)

(56) References Cited

U.S. PATENT DOCUMENTS

| 6,096,125 A * | 8/2000 | Breton | .................... C09D 11/34 |
| | | | 106/31.29 |
| 6,193,361 B1 * | 2/2001 | Wen | .......................... B41J 2/01 |
| | | | 347/84 |

(Continued)

FOREIGN PATENT DOCUMENTS

JP 2010-115854 A 5/2010

*Primary Examiner* — Manish S Shah
(74) *Attorney, Agent, or Firm* — Harness, Dickey & Pierce, P.L.C.

(57) ABSTRACT

An ink jet recording method includes a treatment liquid attachment step, in which a treatment liquid containing a flocculant is attached to a recording medium, and an ink attachment step, in which an ink composition containing a pigment and resin particles is attached to the recording medium by ejecting the ink composition from an ink jet head. When the ink composition is mixed in a 1:1 ratio by mass with a 6% by mass aqueous solution of magnesium sulfate heptahydrate, the volume-average diameter of particles in the mixture is from 2000 to 6000 nm.

13 Claims, 2 Drawing Sheets

(51) Int. Cl.
*C09D 11/322* (2014.01)
*B41M 7/00* (2006.01)
*C09D 11/102* (2014.01)
*B41M 5/00* (2006.01)
*C09D 11/107* (2014.01)
*B41J 2/21* (2006.01)
*B41J 2/01* (2006.01)

(52) U.S. Cl.
CPC ........ *B41M 5/0017* (2013.01); *B41M 5/0023* (2013.01); *B41M 7/009* (2013.01); *C09D 11/102* (2013.01); *C09D 11/107* (2013.01); *C09D 11/322* (2013.01); *C09D 11/38* (2013.01)

(58) Field of Classification Search
CPC .... B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; G02B 5/20; G02B 5/223; C08K 3/11; C08K 2003/2237

See application file for complete search history.

(56) References Cited

U.S. PATENT DOCUMENTS

| | | | |
|---|---|---|---|
| 6,428,143 B2 * | 8/2002 | Irihara | B41J 2/2114 347/100 |
| 2008/0178765 A1 * | 7/2008 | McGorrin | C09D 11/38 106/31.45 |
| 2009/0258203 A1 * | 10/2009 | Aoyama | B41J 2/17509 428/207 |
| 2012/0098883 A1 * | 4/2012 | Matsuyama | B41J 2/2114 347/21 |
| 2012/0287211 A1 * | 11/2012 | Sano | B41J 3/407 347/100 |
| 2013/0135382 A1 * | 5/2013 | Mitsuzawa | C09D 11/322 347/20 |
| 2013/0249996 A1 * | 9/2013 | Saito | B41J 2/2114 347/21 |
| 2015/0035898 A1 * | 2/2015 | Okuda | B41J 2/01 347/20 |
| 2016/0194824 A1 * | 7/2016 | Ohashi | C09D 11/102 347/20 |
| 2017/0166764 A1 * | 6/2017 | Katsuragi | B41J 2/14016 |
| 2017/0232763 A1 * | 8/2017 | Okuda | B41J 2/2114 347/21 |
| 2017/0291431 A1 * | 10/2017 | Nakano | B41J 2/2114 |

* cited by examiner

INK JET RECORDING METHOD, INK JET RECORDING APPARATUS, AND INK SET

The present application is based on, and claims priority from JP Application Serial Number 2019-154435, filed Aug. 27, 2019, the disclosure of which is hereby incorporated by reference herein in its entirety.

BACKGROUND

1. Technical Field

The present disclosure relates to an ink jet recording method, an ink jet recording apparatus, and an ink set.

2. Related Art

Ink jet recording is a method in which droplets of an ink composition are ejected from very thin nozzles and attached to a recording medium to produce a recording. A feature of this method is that a high-resolution and high-quality image can be recorded quickly and with a relatively affordable system.

In recent years, ink jet recording has been applied to recording on films to produce recordings such as product labeling, display signage, and packaging materials. Coated printing paper has also been used as a recording medium.

JP-A-2010-115854 discloses a set of water-based inks that includes a color ink, a resin ink, and a reaction ink. According to JP-A-2010-115854, the aggregation of components of the color and resin inks caused by the reaction ink helps improve printing speed, color strength, and other characteristics.

Unfortunately, this attempt to improve image quality using a reaction ink worsens clogging of the nozzles of the ink jet head, often causing poor ejection. The abrasion resistance of the recording is also affected.

SUMMARY

An ink jet recording method including: a treatment liquid attachment step, in which a treatment liquid containing a flocculant is attached to a recording medium; and an ink attachment step, in which an ink composition containing a pigment and resin particles is attached to the recording medium by ejecting the ink composition from an ink jet head, wherein when the ink composition is mixed in a 1:1 ratio by mass with a 6% by mass aqueous solution of magnesium sulfate heptahydrate, the volume-average diameter of particles in the mixture is from 2000 to 6000 nm.

The above ink jet recording method, wherein the resin particle content of the ink composition is from 0.9 to 13 times the pigment content.

The above ink jet recording method, wherein when the pigment is mixed in a 1:1 ratio by mass with a 6% by mass aqueous solution of magnesium sulfate heptahydrate, the ratio of increase in the volume-average diameter of particles from the pigment before mixing to the mixture is 10 times or more, and when the resin particles are mixed in a 1:1 ratio by mass with a 6% by mass aqueous solution of magnesium sulfate heptahydrate, the ratio of increase in the volume-average diameter of particles from the resin particles before mixing to the mixture is 1.5 times or less.

The above ink jet recording method, wherein the flocculant, contained in the treatment liquid, is any of a cationic polymer, a metal salt, and an organic acid.

The above ink jet recording method, wherein the pigment content is from 0.5% to 5% by mass of the total mass of the ink composition, and the resin particle content is from 1% to 15% by mass of the total mass of the ink composition.

The above ink jet recording method, wherein when the ink composition is mixed in a 1:1 ratio by mass with a 6% by mass aqueous solution of magnesium sulfate heptahydrate, the ratio of increase in the volume-average diameter of particles from the ink composition before mixing to the mixture is from 10 to 60 times.

The above ink jet recording method, wherein the surface temperature of the portion of the recording medium facing the ink jet head in the ink attachment step is 40° C. or less.

The above ink jet recording method, wherein in the ink attachment step, the ink composition attached to the recording medium is dried using an air-blow drying mechanism.

The above ink jet recording method, wherein the treatment liquid attachment step is performed by attaching the treatment liquid to the recording medium by ejecting the treatment liquid from the ink jet head; and a treatment liquid nozzle group, which is a group of nozzles that eject the treatment liquid, and an ink nozzle group, which is a group of nozzles that eject the ink composition, have an overlap in a sub-scanning direction when projected in a main scanning direction.

The above ink jet recording method, wherein in the ink attachment step, the distance between the nozzle surface of the ink nozzle group and the surface of the recording medium when the ink composition is ejected is 3 mm or less.

An ink set including an ink composition and a treatment liquid; the ink set being for use in an ink jet recording method performed by attaching the treatment liquid to a recording medium and attaching the ink composition to the recording medium by ejecting the ink composition from an ink jet head, wherein: the treatment liquid contains a flocculant; the ink composition contains a pigment and resin particles; and when the ink composition is mixed in a 1:1 ratio by mass with a 6% by mass aqueous solution of magnesium sulfate heptahydrate, the volume-average diameter of particles in the mixture is from 2000 to 6000 nm.

An ink jet recording apparatus including: a treatment liquid attachment mechanism, which attaches a treatment liquid containing a flocculant to a recording medium; and an ink jet head, which attaches an ink composition containing a pigment and resin particles to the recording medium by ejecting the ink composition, wherein when the ink composition is mixed in a 1:1 ratio by mass with a 6% by mass aqueous solution of magnesium sulfate heptahydrate, the volume-average diameter of particles in the mixture is from 2000 to 6000 nm.

DESCRIPTION OF EXEMPLARY EMBODIMENTS

Figure 1:
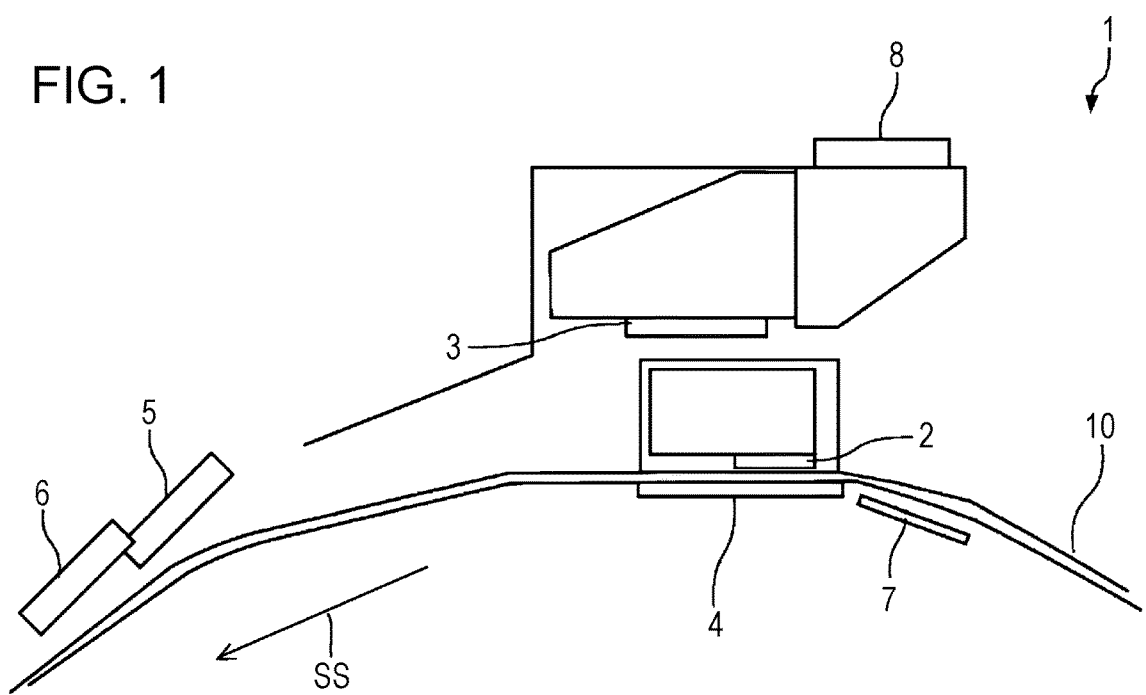
FIG. 1 is an outline cross-sectional diagram schematically illustrating an ink jet recording apparatus.

The following describes embodiments of the present disclosure. The following embodiments are merely examples of the disclosure, and the disclosure is by no means limited to these embodiments.

An ink jet recording method according to this embodiment includes a treatment liquid attachment step, in which a treatment liquid containing a flocculant is attached to a recording medium, and an ink attachment step, in which an ink composition containing a pigment and resin particles attached to the recording medium by ejecting the ink composition from an ink jet head. When the ink composition is mixed in a 1:1 ratio by mass with a 6% by mass aqueous solution of magnesium sulfate heptahydrate, the volume-average diameter of particles in the mixture is from 2000 to 6000 nm.

The ink jet recording method according to this embodiment is for recording with ink jet water-based ink(s). In this method, ink attached to a recording medium is allowed to react with a treatment liquid containing a flocculant for faster fixation of droplets of the ink on the recording medium. This prevents the ink from mixing and moving between droplets connected together, helping avoid damage to image quality, such as damage from a bleed. The resulting image will therefore have good quality.

The ink jet recording method according to this embodiment, moreover, uses an ink composition that contains a pigment and resin particles, and, when this ink composition is mixed in a 1:1 ratio by mass with a 6% by mass aqueous solution of magnesium sulfate heptahydrate, the volume-average diameter of particles in the mixture is from 2000 to 6000 nm. By virtue of this, the use of the treatment liquid leads to good image quality. The use of such an ink composition also helps prevent the clogging of nozzles and achieve abrasion resistance of the resulting recording.

1. INK

The following describes an ink composition used in the ink jet recording method according to this embodiment. An ink composition may hereinafter be referred to simply as ink.

Preferably, the ink is a water-based ink composition. The ink contains a pigment and resin particles. A water-based ink composition is an ink composition that contains water as its or one of its major solvent component(s).

The water, which may be contained as the primary solvent component of the water-based ink composition, is a component that evaporates away upon drying. Preferably, the water is of a type from which ionic impurities have been removed to the lowest possible levels, such as deionized water, ultrafiltered water, reverse osmosis water, distilled water, or any other type of purified or ultrapure water. The use of sterilized water, for example sterilized by ultraviolet irradiation or adding hydrogen peroxide, is preferred because it helps control the development of molds and bacteria when the ink is stored long. The water content is preferably 45% by mass or more, more preferably 50% by mass or more and 98% by mass or less, even more preferably 55% by mass or more and 95% by mass or less of the total mass of the water-based ink composition.

2. VOLUME-AVERAGE DIAMETER OF PARTICLES IN AN INK MIXTURE

When the ink composition in this embodiment is mixed in a 1:1 ratio by mass with a 6% by mass aqueous solution of magnesium sulfate heptahydrate, the volume-average diameter of particles in the mixture is from 2000 to 6000 nm. This volume-average diameter of particles is the median diameter D50.

Specifically, a 6% by mass aqueous solution of magnesium sulfate heptahydrate, which is test solution, is mixed with the ink in a ratio by mass of 1:1. The test solution contains nothing but magnesium sulfate heptahydrate and water.

The mixture is stirred at room temperature for 10 minutes, for example using a magnetic stirrer. The stirring speed is set to ensure the surface of the mixture is conical. With continued stirring, the mixture is sampled by pipetting near its center. The sample is diluted with purified water to a total solids content of 0.01%. The diluted sample is stirred in the same way as above until it reaches a state in which aggregates do not settle down but are uniformly present throughout the liquid. In this state, the liquid is sampled at its center. These are performed at room temperature. The volume-average diameter D50 of particles in the sample is measured by dynamic light scattering, for example using Microtrac-BEL's Nanotrac Wave II analyzer.

An average of three measurements is used as the volume-average diameter D50 of particles after aggregation. The solids represent the components of the ink that are solid when present alone at room temperature, such as the colorant and resins.

The volume-average diameter of particles in the mixture is the particle diameter of particulate components of the mixture averaged by volume across the mixture. Examples of particles include the pigment and the resin particles initially contained in the ink, and also include coarse particles formed by their aggregation caused by the mixing of the ink composition and the test solution.

Preferably, the volume-average diameter of particles in this mixture is from 3000 to 5500 nm, more preferably from 4000 to 5000 nm, even more preferably 4300 to 4800 nm. A volume-average diameter of particles in this mixture not exceeding these ranges advantageously leads to, for example, better prevention of clogging, greater abrasion resistance, and higher gloss. A volume-average diameter of particles in this mixture not falling below these ranges advantageously leads to better control of bleeding image.

The volume-average diameter of particles in the ink before mixing is not critical, but preferably is from 30 to 300 nm, more preferably from 50 to 250 nm, even more preferably from 100 to 200 nm. Such a volume-average diameter of particles in the ink advantageously leads to better prevention of clogging. Such an ink, moreover, is easy to design.

To measure the volume-average diameter of particles in the ink before mixing, the ink is diluted with purified water to a total solids content of 0.01%. The diluted ink can be analyzed in the same way as the mixture.

Preferably, the ratio of the volume-average diameter of particles in the mixture of the ink and the test solution to that of the ink before mixing is from 10 to 60 times, more preferably from 15 to 40 times, even more preferably from 20 to 30 times. Such a ratio of volume-average particle diameters advantageously leads to better prevention of clogging. Such an ink, moreover, is easy to design.

3. RESIN PARTICLES

The ink in this embodiment contains resin particles. The resin particles function as a fixing resin, or to improve the adhesion of the ink attached to the recording medium. Examples of such resin particles include particles of resins such as urethane resins, acrylic resins, styrene-acrylic resins, fluorene resins, polyolefin resins, rosin-modified resins, terpene resins, polyester resins, polyamide resins, epoxy resins, vinyl chloride resins, vinyl chloride-vinyl acetate copolymers, and ethylene vinyl acetate resins. Such types of resin particles are usually handled in emulsion form, but the resin particles may alternatively be a powder. One type of resin particles alone or two or more in combination can be used.

Urethane resins is a generic term for resins that have a urethane bond. A urethane resin can be, for example, a polyether urethane resin, which contains an ether bond in its backbone in addition to a urethane bond, a polyester urethane resin, which contains an ester bond in its backbone, or a polycarbonate urethane resin, which contains a carbonate bond in its backbone.

Acrylic resins is a generic term for polymers obtained by polymerizing an acrylic monomer, such as acrylic acid, methacrylic acid, an acrylate, or a methacrylate, or monomers including at least one acrylic monomer. Examples include resins made of an acrylic monomer, and copolymers of acrylic and other monomers. Examples of the latter include acryl-vinyl resins, which are copolymers of acrylic and vinyl monomers, such as copolymers of an acrylic monomer and styrene or a similar vinyl monomer.

Some kinds of acrylic resins may also be categorized as other type(s) of resins. When such a resin needs to be identified as an acrylic resin or another type of resin herein, the resin is acrylic if the percentage of structures derived from an acrylic monomer is 50% by mass or more of the resin.

Acrylamide and acrylonitrile, for example, are also acrylic monomers that can be used. Commercially available resin emulsions made with an acrylic resin can also be used. Acrylic resins herein also include styrene-acrylic resins as described below.

Styrene-acrylic resins are copolymers of the styrene monomer and an acrylic monomer. Examples include styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers. Commercially available styrene acrylic resins can also be used. Styrene-acrylic resins are included in acrylic resins.

Polyolefin resins are resins that have an olefin, such as ethylene, propylene, or butylene, as its structural backbone. Suitable one(s) selected from known polyolefin resins can be used. Commercially available polyolefin resins can also be used.

Here is a list of commercially available emulsions of resin particles that can be used in this embodiment.

3.1. Styrene-Acrylic Resin Emulsions MICROGEL® E-1002 and E-5002: trade names of Nippon Paint products
VONCOAT® 5454: the trade name of a DIC product
POLYSOL® AP-7020 and SAE1014: trade names of Showa Denko products
VINYBLAN® 2586: the trade name of a Nissin Chemical Industry product
ARROWBASE® CB-1200 and CD-1200: trade names of Unitika Ltd. products
Mowinyl® 966A, 7320, and 975N: trade names of Nippon Synthetic Chemical Industry Co., Ltd. products
Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610: trade names of BASF products 3.2. Acrylic Resin Emulsions
VONCOAT® 4001: the trade name of a DIC product
POLYSOL® AM-710, AM-920, AM-2300, AP-4735, AT-860, and PSASE-4210E: trade names of Showa Denko products
SAIVINOL® SK-200: the trade name of a Saiden Chemical Industry product
AE-120A: the trade name of a JSR product
VINYBLAN® 2682: the trade name of a Nissin Chemical Industry product
Mowinyl® 952B and 718A: trade names of Nippon Synthetic Chemical Industry products
K-854: the trade name of a Chuo Rika Kogyo product
Nipol LX852 and LX874: trade names of Zeon products
3.3. Urethane Resin Emulsions
SUPERFLEX® 870, 800, 150, 420, 460, 470, 610, 700, 460s, 840, and E-4000: trade names of DKS products
PERMARIN® UA-150: the trade name of a Sanyo Chemical Industries, Ltd. product
Sancure 2710: the trade name of a Lubrizol Japan product
NeoRez® R-9660, R-9637, and R-940: trade names of Kusumoto Chemicals, Ltd. products
ADEKA BONTIGHTER® HUX-380 and 290K: trade names of ADEKA Corporation products
RESAMINE® D-1060, D-2020, D-4080, D-4200, D-6300, and D-6455: trade names of Dainichiseika Color & Chemicals Mfg. Co., Ltd. products
Takelac® W-6020, W-635, W-6061, W-605, W-635, W-6021, and W-512-A-6: trade names of Mitsui Chemicals Polyurethanes products 3.4. Characteristics of the Resin Particles Preferably, the glass transition temperature Tg of the resin particles is −50° C. or more and 200° C. or less, more preferably 0° C. or more and 150° C. or less, even more preferably 50° C. or more and 100° C. or less.

Such a glass transition temperature Tg of the resin particles tends to result in higher durability of the recording and better prevention of clogging. The glass transition temperature can be measured according to JIS K7121 Testing Methods for Transition Temperatures of Plastics, for example using Hitachi High-Tech Science Corporation's "DSC7000" differential scanning colorimeter.

The resin particle content of the ink is preferably 0.1% by mass or more on a solids basis, preferably 20% by mass or less, of the total mass of the ink. Preferably, the resin particle content is from 1% to 15% by mass, more preferably from 2% to 13% by mass, even more preferably from 3% to 10% by mass.

When the resin particles are mixed with a 6% by mass aqueous solution of magnesium sulfate heptahydrate, the volume-average diameter of particles in the mixture is preferably 1000 nm or less, more preferably 500 nm or less, even more preferably 300 nm or less. There is no lower limit, but preferably this volume-average particle diameter is 10 nm or more, more preferably 50 nm or more, even more preferably 100 nm or more.

A volume-average diameter of particles in this mixture not exceeding these ranges advantageously leads to, for example, greater abrasion resistance and better prevention of clogging. A volume-average diameter of particles in this mixture not falling below these ranges advantageously leads to better control of bleeds.

To measure the volume-average diameter of particles in this mixture, an aqueous dispersion of the resin particles is prepared. This dispersion is used with the same test solution as in the above-described measurement of the volume-average diameter of particles in the mixture of the ink and a 6% by mass aqueous solution of magnesium sulfate heptahydrate. The aqueous dispersion of the resin and the test solution are mixed to make the ratio by mass of the resin to magnesium sulfate, both on a solids basis, 4:1.

The resulting mixture is diluted with purified water to a total solids content of 0.01%. The volume-average diameter of particles in this diluted liquid is measured. The methods of dilution and measurement are the same as in the above-described measurement of the volume-average diameter of particles in an ink mixture.

Preferably, the volume-average diameter of the resin particles before mixing with the test solution is from 10 to 300 nm, more preferably from 50 to 250 nm, even more preferably from 100 to 230 nm. Such a volume-average diameter of the resin particles advantageously leads to, for example, better prevention of clogging.

To measure the volume-average diameter of the resin particles, the aforementioned aqueous dispersion of the resin particles is diluted with purified water to a solid resin content of 0.01%. The volume-average diameter of particles in this diluted liquid is measured. The methods of dilution and measurement are the same as in the above-described measurement of the volume-average diameter of particles in an ink mixture.

Preferably, the ratio of the volume-average diameter of particles in the mixture of the resin particles and the test solution to that of the resin particles before mixing is 2 times or less, preferably 1.5 times or less, more preferably 1.2 times or less, even more preferably 1.1 times or less, in particular 1.05 times or less. There is no lower limit, but preferably this ratio is 1 time or more. Resin particles that mix with the test solution without an increase in volume-average diameter are preferred. Such a ratio of volume-average particle diameters advantageously leads to better prevention of clogging and greater abrasion resistance.

When one wants to use resin particles that have a relatively small volume-average diameter when mixed with a 6% by mass aqueous solution of magnesium sulfate heptahydrate, a possible way is to select a resin that does not easily aggregate when mixed with magnesium sulfate.

Examples of such resins include resin particles dispersed with an emulsifier. Whether dispersed with an emulsifier or not, resins with a low acid value as measured by a potentiometric titration method based on JIS K2501 are preferred. The acid value is preferably 20 mg KOH/g or less, more preferably 10 mg KOH/g or less, more preferably 5 mg KOH/g or less, even more preferably 1 mg KOH/g or less. As for the lower limit, the acid value is 0 mg KOH/g or more.

The resin particles dispersed with an emulsifier, when used, are preferably ones made using much emulsifier to emulsify and disperse the particles.

When one wants to use resin particles that have a relatively large volume-average diameter when mixed with a 6% by mass aqueous solution of magnesium sulfate heptahydrate, possible approaches include selecting a resin with a relatively high acid value as defined above, using less emulsifier to emulsify and disperse the particles, and choosing self-dispersible resin particles, which are resin particles made without an emulsifier.

4. PIGMENT

The ink in this embodiment contains a pigment. Examples of pigments that can be used include process color pigments, such as cyan, yellow, magenta, and black pigments, and spot color pigments, such as white and glitter pigments.

Examples of process color pigments include quinacridone pigments, quinacridone quinone pigments, dioxane pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, thioindigo pigments, isoindolinone pigments, azomethine pigments, dye chelates, dyeing lakes, nitro pigments, nitroso pigments, aniline black, and azo pigments, such as insoluble azo pigments, condensed azo pigments, azo lakes, and chelate azo pigments.

Specific examples of process color pigments include the following.

Examples of pigments used in cyan ink include C.I. Pigment Blue pigments, such as C.I. Pigment Blue 1, 2, 3, 15:3, 15:4, 16, 22, and 60; and C.I. Vat Blue pigments, such as C.I. Vat Blue 4 and 60. Preferably, one or a mixture of two or more selected from the group consisting of C.I. Pigment Blue 15:3, 15:4, and 60 is used.

Examples of pigments used in magenta ink include C.I. Pigment Red pigments, such as C.I. Pigment Red 5, 7, 12, (Ca), 48 (Mn), 57 (Ca), 57:1, 112, 122, 123, 168, 184, and 202, and C.I. Pigment Violet pigments, such as C.I. Pigment Violet 19. Preferably, one or a mixture of two or more selected from the group consisting of C.I. Pigment Red 122, 202, and 209 and C.I. Pigment Violet 19 is used.

Examples of pigments used in yellow ink include C.I. Pigment Yellow pigments, such as C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185. Preferably, one or a mixture of two or more selected from the group consisting of C.I. Pigment Yellow 74, 109, 110, 128, and 138 is used.

In orange ink, C.I. Pigment Orange 36 or 43 or their mixture is used.

In green ink, C.I. Pigment Green 7 or 43 or their mixture is used.

Examples of carbon black pigments include C.I. Pigment Black 7 pigments, such as furnace black, lamp black, acetylene black, and channel black.

Examples of commercially available carbon black pigments include the following.
- No. 2300, 900, MCF88, No. 20B, No. 33, No. 40, No. 45, No. 52, MA7, MA8, MA100, No. 2200B, etc.: trade names of Mitsubishi Chemical Corporation products
- Color Black FW1, FW2, FW2V, FW18, FW200, 5150, 5160, and S170, Printex 35, U, V, and 140U, Special Black 6, 5, 4A, 4, and 250, etc.: trade names of Degussa products
- Conductex® SC, Raven 1255, 5750, 5250, 5000, 3500, 1255, and 700, etc.: trade names of Columbian Carbon products
- REGAL 400R, 330R, and 660R, MOGUL L, MONARCH® 700, 800, 880, 900, 1000, 1100, 1300, and 1400, ELFTEX® 12, etc.: trade names of Cabot products One or a mixture of two or more of such carbon black pigments may be used.

A glitter pigment can be of any kind that glitters on a medium. Examples include metal particles and pearl pigments.

Examples of metal particles include particles of one, or an alloy of two or more, selected from the group consisting of aluminum, silver, gold, platinum, nickel, chromium, tin, zinc, indium, titanium, and copper. Particles of alloys are also referred to as metallic pigments.

For pearl pigments, or pigments having a pearly gloss, typical examples include pigments having a pearlescent or interference gloss, such as titanium dioxide-coated mica, pearl essence, and bismuth oxychloride. Glitter pigments surface-treated to be inert with water can also be used.

Examples of white pigments include metal compounds, such as metal oxides, barium sulfate, and calcium carbonate. Examples of metal oxides include titanium dioxide, zinc oxide, silica, alumina, and magnesium oxide. Hollow particles can also be used as a white pigment.

One such pigment or two or more in combination may be used. The use of organic pigment(s) is preferred in terms of storage stability characteristics, such as light fastness, weather resistance, and resistance to gases.

The pigment content of the ink is preferably 0.2% by mass or more, preferably 20% by mass or less, of the total mass of the ink. More preferably, the pigment content of the ink is from 0.3% to 15% by mass, even more preferably from 1% to 10% by mass, in particular from 2% to 5% by mass. Such a pigment content is advantageous in that it ensures the ink is unlikely to cause problems such as the clogging of the nozzles of the ink jet recording apparatus used therewith while achieving a satisfactory color density.

Preferably, the ratio by mass between the resin particle content and the pigment content, resin particles/pigment, is from 0.5 to 15 times, preferably from to 8 times, more preferably from 1.5 to 5 times, in particular from 2 to 4 times. Such a ratio between the resin particles and the pigment advantageously leads to, for example, better prevention of clogging and greater abrasion resistance.

When the pigment is mixed with a 6% by mass aqueous solution of magnesium sulfate heptahydrate, the volume-average diameter of particles in the mixture is preferably 1000 nm or more, more preferably 3000 nm or more, even more preferably 5000 nm or more. There is no upper limit, but preferably this volume-average particle diameter is 30000 nm or less, more preferably 10000 nm or less, even more preferably 6000 nm or less. Such a volume-average diameter of particles in this mixture advantageously leads to, for example, greater abrasion resistance, more effective prevention of clogging, and better control of bleeds.

To measure the volume-average diameter of particles in this mixture, an aqueous dispersion of the pigment is prepared. This aqueous dispersion of the pigment is used with the same test solution as in the above-described measurement of the volume-average diameter of particles in the mixture of the ink and a 6% by mass aqueous solution of magnesium sulfate heptahydrate. The aqueous dispersion of the pigment and the test solution are mixed to make the ratio by mass of the pigment to magnesium sulfate, both on a solids basis, 4:1.

The mixture of the aqueous dispersion of the pigment and the test solution is diluted with purified water to a total solids content of 0.01%, and the volume-average diameter of particles is measured. The methods of dilution and measurement are the same as in the above-described measurement of the volume-average diameter of particles in an ink mixture.

Preferably, the volume-average diameter of particles of the pigment before mixing with the test solution is from 10 to 300 nm, more preferably from 30 to 250 nm, even more preferably from 100 to 200 nm. Such a volume-average diameter of particles of the pigment advantageously leads to, for example, better prevention of clogging.

To measure the volume-average diameter of particles of the pigment, an aqueous dispersion of the pigment is prepared, and this dispersion is diluted with purified water to a solid pigment content of 0.01%. The volume-average diameter of particles in this diluted liquid is measured. The methods of dilution and measurement are the same as in the above-described measurement of the volume-average diameter of particles in an ink mixture.

Preferably, the ratio of the volume-average diameter of particles in the mixture of the pigment and the test solution to that of the pigment before mixing is 10 times or more, more preferably 20 times or more, even more preferably 25 times or more, in particular 30 times or more. There is no upper limit, but preferably this ratio is 100 times or less.

Such a ratio of volume-average particle diameters advantageously leads to, for example, better prevention of clogging.

In ink jet recording, the ink in this embodiment, containing resin particles and a pigment, can dry near nozzles, or in and around nozzles, and this causes the solid components of the ink to concentrate. When this occurs, the resin particles come into contact and fuse together, and the fused particles can cause poor ejection by clogging nozzles.

For example, a pigment that forms particles having a relatively large volume-average diameter when mixed with the aforementioned test solution aggregates when touching the treatment liquid near the nozzles. Aggregates of the pigment are unlikely to cause poor ejection. They hardly obstruct the ejection of the ink from the nozzles, for example because they do not fuse together but do break easily.

Such aggregates of pigment serve as spacers that prevent fused resin particles from growing large near the nozzles, and their tendency to easily break influences the fused resin particles to make them easily break likewise. As a result, the obstruction of the ejection of the ink from the nozzles caused by fused resin particles is prevented or reduced.

As for resin particles, particles that have a relatively small volume-average diameter when mixed with the test solution are preferred because they leads to better prevention of clogging.

During a recording task, as stated, the resin particles can aggregate when touching the treatment liquid near the nozzles. Even when this occurs, resin particles that have a relatively small volume-average diameter when mixed with the test solution appear to benefit more from the pigment's effects of serving as spacers and breaking fused particles. As a result, the inventors believe, clogging is prevented more effectively.

Preferably, the pigment can be stably dispersed in the ink. A surface modification, such as oxidation or sulfonation, of pigment particles, for example with ozone, hypochlorous acid, or fuming sulfuric acid, may be exercised to make the pigment self-dispersible, or a resin dispersant may be used. The resin used as the resin dispersant is one suitable for the dispersion of pigment, preferably a water-soluble or semi-water-soluble resin.

Examples of resin dispersants include polyvinyl alcohols, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-α-methylstyrene-acrylic acid copolymers, styrene-α-methylstyrene-acrylic acid-acrylate copolymers, styrene-maleic acid copolymers, styrene-maleic anhydride copolymers, vinylnaphthalene-acrylic acid copolymers, vinylnaphthalene-maleic acid copolymers, vinyl acetate-maleate copolymers, vinyl acetate-crotonic acid copolymers, vinyl acetate-acrylic acid copolymers, and their salts.

Of these, acrylic resins are preferred. Acrylic resins is a generic term for polymers obtained by polymerizing an acrylic monomer, such as acrylic acid, methacrylic acid, an acrylate, or a methacrylate, or monomers including at least one acrylic monomer. Examples include resins made of an acrylic monomer and copolymers of acrylic and other monomers. Examples of the latter include acryl-vinyl resins, which are copolymers of acrylic and vinyl monomers, such as copolymers of an acrylic monomer and styrene or a similar vinyl monomer.

Copolymers of a monomer having a hydrophobic functional group and a monomer having a hydrophilic functional group and polymers made of a monomer having both hydrophobic and hydrophilic functional groups are particularly preferred. Any form of a copolymer, i.e., a random, block, alternating, or graft copolymer, can be used.

A resin dispersant as described above improves the dispersibility of the pigment. The resin dispersant and the resin particles, described above, are similar in that they are both resins, but differ in that whereas the resin particles are in emulsion form in the ink, the resin dispersant is not. The resin dispersant may have, for example, solubility in water, or may be present around the pigment by adhering to the pigment.

The resin dispersant content can be selected as appropriate for the pigment to be dispersed. Preferably, the resin dispersant content is 5 parts by mass or more and 200 parts by mass or less, more preferably 20 parts by mass or more and 100 parts by mass or less, per 100 parts by mass of the pigment in the ink.

The volume-average diameter of particles of the pigment in its mixture can be adjusted by changing the amount of anionic groups on the surface of the pigment or, when a resin dispersant is used to disperse the pigment, by customizing the acid value of the resin dispersant. Examples of anionic groups include the carboxyl group and the sulfone group. For example, increasing the amount of anionic groups on the pigment and/or the acid value of the resin dispersant helps promote the aggregation of the pigment, thereby helping increase the volume-average diameter of particles in the pigment mixture. The opposite helps prevent the aggregation of the pigment, thereby helping reduce the volume-average diameter of particles in the pigment mixture.

By repeating this adjustment and the measurement of the volume-average particle diameter in a mixture with the desired pigment, the desired volume-average diameter of particles in the pigment mixture can be achieved.

The acid value of the resin dispersant is preferably 20 mg/g KOH or more, more preferably 30 mg/g KOH or more, even more preferably 50 mg/g KOH or more, for the promotion of the aggregation of the pigment. There is no upper limit, but preferably the acid value of the resin dispersant is 200 mg/g KOH or less, more preferably 150 mg/g KOH or less.

The acid value of the resin dispersant and that of the resin particles, described above, can be adjusted by customizing the species and/or proportions of the monomer(s) used to prepare the resin. The use of a monomer having an anionic group or a monomer having more anionic groups or increasing the proportion of such a monomer helps increase the acid value of the resin.

To obtain an ink that gives a mixture with a 6% by mass aqueous solution of magnesium sulfate heptahydrate in which the volume-average diameter of particles is in any of the ranges specified above, the resin particles and pigment used therein are selected first. In selecting them, attention is paid to the volume-average particle diameter they have in their mixtures as described above. Then ink is prepared with the selected resin particles and pigment. The amounts of the resin particles and the pigment are adjusted to ensure the volume-average diameter of particles in the mixture of the ink and a 6% by mass aqueous solution of magnesium sulfate heptahydrate will fall within any of the ranges specified above.

Preferably, the ink is made with a pigment that forms particles having a relatively large volume-average diameter in its mixture and resin particles that have a relatively small volume-average particle diameter in their mixture. This advantageously leads to better prevention of clogging.

5. EXTRA INGREDIENTS

The ink may further contain extra ingredients. Examples include an organic solvent, a surfactant, and an excipient.

5.1. Organic Solvent

The ink included in the ink set in this embodiment may contain an organic solvent. Water-miscible organic solvents are preferred. The organic solvent serves to, for example, improve the wettability of the ink on the recording medium and increase the water retention of the ink. Examples of water-miscible organic solvents include alkylene glycol ethers, nitrogen-containing solvents, and polyhydric alcohols.

An alkylene glycol ether can be a monoether or diether of any alkylene glycol compound. The alkylene glycol compound can be, for example, an alkylene glycol or a condensate formed by the condensation between hydroxyl groups of molecules of an alkylene glycol. The number of condensations of a condensate is preferably from 2 to 5, and an alkylene glycol is preferably a C1-4 alkylene glycol. The ether is preferably an alkyl ether, preferably a C1-4 alkyl ether.

Examples of nitrogen-containing solvents include cyclic amides and acyclic amides. Examples of acyclic amides include alkoxyalkylamides.

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-isopropoxy-N,N-dimethylpropionamide, 3-isopropoxy-N,N-diethylpropionamide, 3-isopropoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of cyclic amides include lactams, such as pyrrolidones including 2-pyrrolidone, 1-methyl-2-pyrrolidone, 1-ethyl-2-pyrrolidone, 1-propyl-2-pyrrolidone, and 1-butyl-2-pyrrolidone. These are preferred in that they help the resin particles form film. 2-Pyrrolidone is particularly preferred.

Examples of polyhydric alcohols include, for instance, the following.

1,2-Alkanediols, e.g., alkanediols such as ethylene glycol, propylene glycol, also known as propane-1,2-diol, 1,2-butanediol, 1,2-pentanediol, 1,2-hexanediol, 1,2-heptanediol, and 1,2-octanediol Polyhydric alcohols other than 1,2-alkanediols, or polyols, e.g., diethylene glycol, dipropylene glycol, 1,3- propanediol, 1,3-butanediol, also known as 1,3-butylene glycol, 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerol A polyhydric alcohol can be an alkanediol or a polyol. An alkanediol in this context is a diol of a C5 or longer alkane. The number of carbon atoms in the alkane is preferably from 5 to 15, more preferably from 6 to 10, even more preferably from 6 to 8. A 1,2-alkanediol is preferred.

A polyol in this context is a polyol of a C4 or shorter alkane or a condensate formed by intermolecular condensation between hydroxy groups of a polyol of a C4 or shorter alkane. The number of carbon atoms in the alkane is preferably 2 or 3. The number of hydroxy groups in the molecule of the polyol is 2 or more, preferably 5 or less, more preferably 3 or less. When the polyol is the aforementioned condensate, the number of intermolecular condensations is 2 or more, preferably 4 or less, more preferably 3 or less. One polyhydric alcohol or two or more as a mixture can be used.

Alkanediols and polyols can function primarily as penetration solvents and/or moisturizing solvents. Alkanediols, however, tend to behave more as penetration solvents, and polyols tend to behave more as moisturizing solvents.

The ink may contain one water-miscible organic solvent alone or may contain two or more in combination. The total percentage of water-miscible organic solvents to the total mass of the ink is, for example, 5% by mass or more and 50% by mass or less, preferably 10% by mass or more and 45% by mass or less, more preferably 15% by mass or more and 40% by mass or less, even more preferably 20% by mass or more and 30% by mass or less. When the percentage of water-miscible organic solvents is in any of these ranges, it is easier to form images of higher quality by virtue of a better balance between the wetting and spread and the drying of the ink.

Water-miscible organic solvents having a normal boiling point of 160° C. to 280° C. are preferred. Preferably, the percentage of organic solvent polyols that are liquid at 25° C. and have a normal boiling point exceeding 280° C. is 5% by mass or less of the total mass of the ink. The percentage is more preferably 3% by mass or less, even more preferably 1% by mass or less, in particular 0.5% by mass or less. As for the lower limit, the percentage is 0% by mass or more; the ink may be free of such polyols. This helps improve the adhesion of the ink to the recording medium by ensuring good drying characteristics of the ink attached to the recording medium.

More preferably, the percentage of organic solvents that are liquid at 25° C. and have a normal boiling point exceeding 280° C. to the total mass of the ink is any of the ranges specified above. This helps further improve the adhesion of the ink to the recording medium by providing better drying characteristics of the ink attached to the recording medium. Polyols are not the only organic solvents having a normal boiling point exceeding 280° C. To name a few, glycerol and polyethylene glycol monomethyl ether are also examples of such solvents.

For nitrogen-containing solvents, the percentage in the ink is preferably 1% by mass or more and 30% by mass or less, more preferably 5% by mass or more and 25% by mass or less, even more preferably 10% by mass or more and 20% by mass or less, in particular 11% by mass or more and 17% by mass or less. This leads to, for example, greater abrasion resistance.

For polyhydric alcohols, the percentage in the ink is preferably 1% by mass or more and 27% by mass or less, more preferably 5% by mass or more and 20% by mass or less, even more preferably 7% by mass or more and 15% by mass or less. This leads to, for example, greater abrasion resistance.

5.2. Surfactant

The ink may contain a surfactant. A function of the surfactant is to improve the wettability of the ink on the recording medium by reducing the surface tension of the ink. Among surfactants, acetylene glycol surfactants, silicone surfactants, and fluorosurfactants, for example, are particularly preferred.

An acetylene glycol surfactant can be of any kind, but examples include the following.

Surfynol® 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D: trade names of Air Products and Chemicals products OLFINE® B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3: trade names of Nissin Chemical Industry products ACETYLENOL® E00, E00P, E40, and E100: trade names of Kawaken Fine Chemicals products A silicone surfactant can be of any kind, but examples of preferred silicone surfactants include polysiloxane compounds. Any kind of polysiloxane compound can be used, but an example is polyether-modified organosiloxanes.

Examples of commercially available polyether-modified organosiloxanes include the following.

BYK-306, BYK-307, BYK-333, BYK-341, BYK-345, BYK-346, and BYK-348: trade names of BYK Japan products KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017: trade names of Shin-Etsu Chemical products A fluorosurfactant is preferably a fluorine-modified polymer. Specific examples include the following.

BYK-3440: BYK Japan

SURFLON® S-241, S-242, and S-243: trade names of AGC Seimi Chemical products

FTERGENT® 215M: NEOS

When containing a surfactant, the ink may contain multiple surfactants. The surfactant content, when contained, of the ink can be 0.1% by mass or more and 4.0% by mass or less, preferably 0.2% by mass or more and 3.0% by mass or less, more preferably 0.5% by mass or more and 2.0% by mass or less of the total mass of the ink.

5.3. Excipient

The ink may contain, for example, a urea compound, an amine, or a saccharide as an excipient.

Examples of urea compounds include compounds like urea, ethylene urea, tetramethylurea, thiourea, and 1,3-dimethyl-2-imidazolidinone and betaines.

Examples of betaines include trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, and acetylcarnitine.

Examples of amines include diethanolamine, triethanolamine, and triisopropanolamine. Urea compounds and amines may also be used as pH modifiers.

Examples of saccharides include glucose, mannose, fructose, ribose, xylose, arabinose, galactose, aldonic acid, glucitol, also known as sorbitol, maltose, cellobiose, lactose, sucrose, trehalose, and maltotriose.

5.4. Others

The ink according to this embodiment may optionally contain ingredients such as a preservative/fungicide, an antirust, a chelating agent, wax, a viscosity modifier, an antioxidant, and an antimold.

6. WATER-SOLUBLE RESIN

The ink may further contain a water-soluble resin. A water-soluble resin in this context refers to a resin that is present dissolved in the solvent component of the ink. A water-soluble resin is a resin that gives a transparent solution, or a solution with no precipitate or turbidity therein, when 5% by mass is dissolved in water at room temperature.

Examples of water-soluble resins include resins that can be used as the resin particles described above, but they need to have a hydrophilic substructure much enough to be soluble in water. Resins such as acrylic, urethane, polyester, and polyether resins are preferred.

7. TREATMENT LIQUID

The treatment liquid used in this embodiment contains a flocculant that causes components of the ink composition to aggregate.

7.1. Flocculant

The treatment liquid contains a flocculant that causes components of the ink composition to aggregate. The flocculant reacts with the pigment, resin particles, etc., in the ink to cause the pigment and resin particles to aggregate. The degree of aggregation of the pigment and resin particles caused by the flocculant varies, for example according to the type of the flocculant, pigment, and resin particles and how the pigment is dispersed, and can be adjusted by the selection of compositions. The aggregation helps, for example, improve the color strength of the pigment, improve the fixation of the resin particles, and/or increase the viscosity of the ink.

Any kind of flocculant can be used, but examples include metal salts, organic or inorganic acids, and other cationic compounds.

Examples of cationic compounds that can be used other than metal salts and acids include cationic resins, or cationic polymers, and cationic surfactants. Polyvalent metal salts, cationic resins, and organic acids are particularly preferred. The use of the treatment liquid leads to effective control of bleeding image.

Polyvalent metal salts are compounds formed by a metal ion having a valency of 2 or more and an anion. The metal ion having a valency of 2 or more can be, for example, the ion of calcium, magnesium, copper, nickel, zinc, barium, aluminum, titanium, strontium, chromium, cobalt, or iron. Of such metal ions that can be a component of polyvalent metal salts, it is particularly preferred to use at least one of the calcium and magnesium ions. These metal ions are superior in the potential for aggregating components of the ink composition.

The anion in a polyvalent metal salt is an inorganic or organic ion. That is, a polyvalent metal salt in this embodiment is formed by an inorganic or organic ion and a polyvalent metal. An inorganic ion can be, for example, the chloride, bromide, iodide, nitrate, sulfate, or hydroxide ion. An organic ion can be, for example, an organic acid ion, such as the carboxylate ion.

Ionic polyvalent metal salts are preferred. In particular, magnesium and calcium salts give the treatment liquid better stability. The counterion for the polyvalent metal may be an inorganic acid or organic acid ion.

Specific examples of polyvalent metal salts include calcium carbonates, such as heavy calcium carbonate and light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, and aluminum acetate. One such polyvalent metal salt may be used alone, or two or more may be used in combination. Of these, it is particularly preferred to use at least one of magnesium sulfate, calcium nitrate, and calcium chloride, more preferably calcium nitrate. These salts are sufficiently soluble in water, and they also help reduce marking caused by the treatment liquid and make the marking inconspicuous. Metal salts that are hydrated in their raw-material form can also be used.

Monovalent metal salts can also be used. Examples of monovalent metal salts include those obtained by replacing the metal ion having a valency of 2 or more in polyvalent metal salts such as listed above with a monovalent metal ion. Examples of monovalent metal ions include the potassium and sodium ions.

As for acids, examples of preferred organic acids include polyacrylic acid, polymethacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumarinic acid, thiophenecarboxylic acid, nicotinic acid, derivatives of these compounds, and salts thereof. Carboxylic acids are preferred. One organic acid may be used alone, or two or more may be used in combination. Salts of organic or inorganic acids that are metal salts are herein categorized as metal salts.

Examples of preferred inorganic acids include sulfuric acid, hydrochloric acid, nitric acid, phosphoric acid, and salts thereof. One inorganic acid may be used alone, or two or more may be used in combination.

Examples of cationic resins, or cationic polymers, include cationic urethane resins, cationic olefin resins, and cationic amine resins.

For cationic urethane resins, suitable one(s) selected from known cationic urethane resins can be used. Examples of commercially available cationic urethane resins that can be used include the following.

HYDRAN® CP-7010, CP-7020, CP-7030, CP-7040, CP-7050, CP-7060, and CP-7610: trade names of Dainippon Ink and Chemicals, Inc. products SUPERFLEX® 600, 610, 620, 630, 640, and 650: trade names of DKS Co. Ltd. products WBR-2120C and WBR-2122C urethane emulsions: trade names of Taisei Fine Chemical Co., Ltd. products Cationic olefin resins are resins that have an olefin, such as ethylene or propylene, as their structural backbone, and suitable one(s) selected from known cationic olefin resins can be used. Cationic olefin resins in emulsion form, in which the resin has been dispersed in water or an organic or other solvent, can also be used. Commercially available cationic olefin resins can also be used, such as ARROW-BASE® CB-1200 and CD-1200, trade names of Unitika Ltd. products.

Cationic amine resins, or cationic amine polymers, include any cationic resin or polymer that has an amino group in its structure, and suitable one(s) selected from known cationic amine resins can be used. Examples include polyamine resins, polyamide resins, and polyallylamine resins. Polyamine resins have an amino group in their polymer backbone, polyamide resins have an amide group in their polymer backbone, and polyallylamine resins have an allyl-derived structure in their polymer backbone.

Examples of cationic polyamine resins include the following.

UNISENCE KHE103L hexamethylenediamine/epichlorohydrin resin; pH of a 1% aqueous solution, approximately 5.0; viscosity, 20 to 50 mPa·s; an aqueous solution with a solids concentration of 50% by mass: Senka Corporation UNISENCE KHE104L dimethylamine/epichlorohydrin resin; pH of a 1% aqueous solution, approximately 7.0; viscosity, 1 to 10 mPa·s; an aqueous solution with a solids concentration of 20% by mass: Senka Corporation Catiomaster® PD resins, aqueous solutions of polymers produced by amine-epichlorohydrin condensation: Yokkaichi Chemical, Co., Ltd.

Examples of cationic surfactants include primary, secondary, and tertiary amine salt compounds, alkylamine salts, dialkylamine salts, aliphatic amine salts, benzalkonium salts, quaternary ammonium salts, quaternary alkylammonium salts, alkylpyridinium salts, sulfonium salts, phosphonium salts, onium salts, and imidazolinium salts.

Specific examples include hydrochlorides, acetates, and similar salts of laurylamine, coconut amine, and rosin amine and lauryltrimethylammonium chloride, cetyltrimethylammonium chloride, benzyltributylammonium chloride, benzalkonium chlorides, dimethylethyllaurylammonium ethyl sulfate, dimethylethyloctylammonium ethyl sulfate, trimethyllaurylammonium hydrochloride, cetylpyridinium chloride, cetylpyridinium bromide, dihydroxyethyllaurylamine, decyldimethylbenzylammonium chloride, dodecyldimethylbenzylammonium chloride, tetradecyldimethylammonium chloride, hexadecyldimethylammonium chloride, and octadecyldimethylammonium chloride.

More than one of such flocculants may be used. The use of at least one selected from polyvalent metal salts, organic acids, and cationic resins helps form an image of higher quality, with a high color strength in particular, by virtue of their superior flocculating effect.

The total flocculant content of the treatment liquid is, for example, 0.1% by mass or more and 20% by mass or less, preferably 0.5% by mass or more and 15% by mass or less, more preferably 1% by mass or more and 10% by mass or less, even more preferably from 2% to 5% by mass or less of the total mass of the treatment liquid. A flocculant content of 0.1% by mass or more is enough for the flocculant to flocculate components of the ink effectively. A flocculant content of 30% by mass or less leads to better dissolution or dispersion of the flocculant in the treatment liquid, thereby helping improve, for example, the storage stability of the treatment liquid.

Preferably, the solubility of the flocculant in 100 g of water at 25° C. is 1 g or more, more preferably 3 g or more and 80 g or less. This ensures the flocculant dissolves well in the treatment liquid even when the treatment liquid contains a highly hydrophobic organic solvent.

7.2. Extra Ingredients

Preferably, the treatment liquid is a water-based composition. Besides the flocculant, the treatment liquid may contain ingredients such as water, a water-miscible organic solvent, a surfactant, an excipient, a preservative/fungicide, an antirust, a chelating agent, a viscosity modifier, an antioxidant, an antimold, and a resin as described in the Ink section. Preferably, the colorant content is 0.1% by mass or less, more preferably 0.05% by mass or less, even more preferably 0.01% by mass or less in the treatment liquid. As for the lower limit, the colorant content is 0% by mass or more.

8. INK SET

An ink set according to this embodiment includes a treatment liquid that contains a flocculant and an ink composition that contains a pigment and resin particles. When the ink composition is mixed in a 1:1 ratio by mass with a 6% by mass aqueous solution of magnesium sulfate heptahydrate, the volume-average diameter of particles in the mixture is from 2000 to 6000 nm. This ink set, moreover, is for use in the recording method according to this embodiment, described above, and includes a treatment liquid and an ink composition as described above.

9. INK JET RECORDING APPARATUS

An ink jet recording apparatus according to this embodiment is for recording by the ink jet recording method described above. The apparatus includes a treatment liquid attachment mechanism, which attaches a treatment liquid containing a flocculant to a recording medium, and an ink jet head, which attaches an ink composition to the recording medium. Optionally, the apparatus may have, for example, heaters, which heat the recording medium, and a blower, which sends air to the recording medium.

The following describes an example of an ink jet recording apparatus for the ink jet recording method according to this embodiment.

Figure 2:
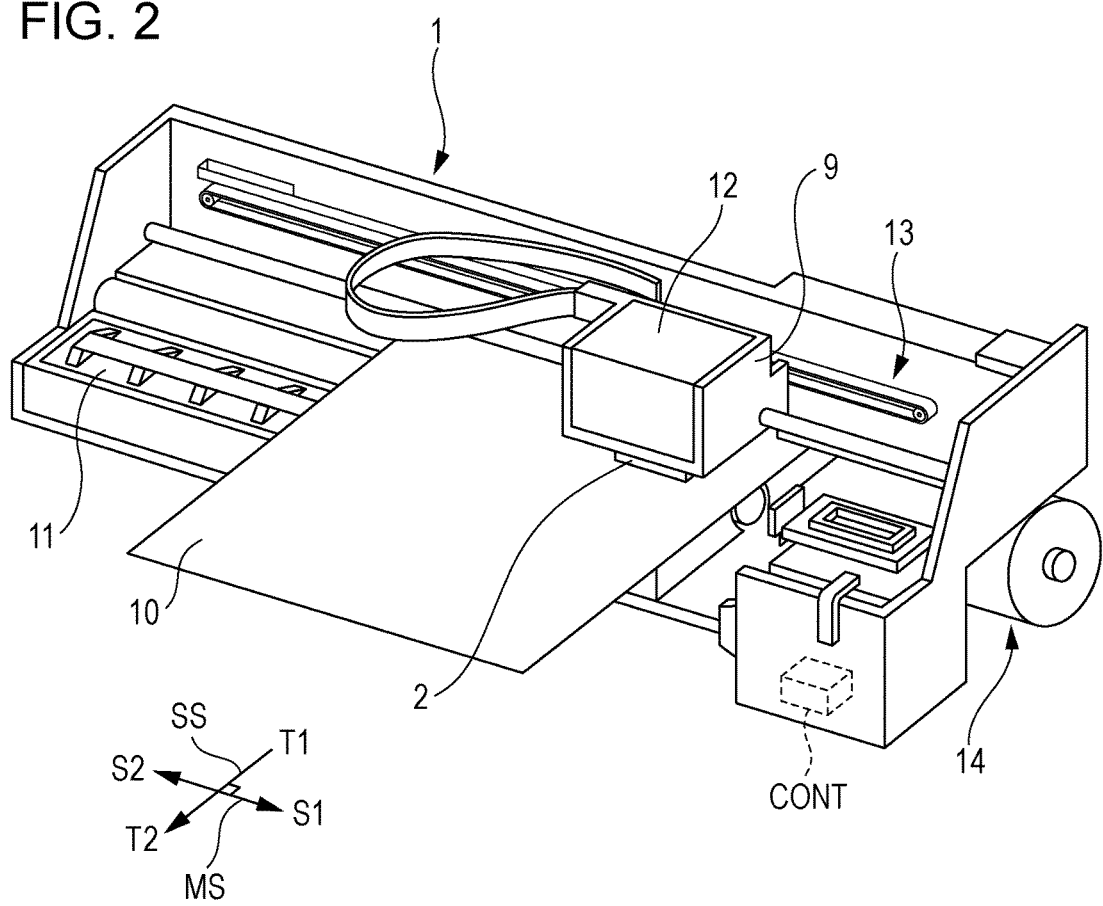
FIG. 2 is a perspective view of the carriage and related components of the ink jet recording apparatus illustrated in FIG. 1 in their exemplary configuration.

FIG. 1 is an outline cross-sectional diagram schematically illustrating the ink jet recording apparatus. FIG. 2 is a perspective view of the carriage and related components of the ink jet recordincg apparatus 1 illustrated in FIG. 1 in their exemplary configuration.

As illustrated in FIGS. 1 and 2, the ink jet recording apparatus 1 has an ink jet head 2, an IR heater 3, a platen heater 4, a heating heater 5, a cooling fan 6, a preheater 7, an aeration fan 8, a carriage 9, a platen 11, a carriage-moving mechanism 13, a transporter 14, a control unit CONT, and a casing 12 that holds, for example, a driver for the ink jet head 2.

The control unit CONT, illustrated in FIG. 2, controls the overall operation of the ink jet recording apparatus 1. Somewhere other than the carriage 9 the ink jet recording apparatus 1 has a liquid reservoir, not illustrated, from which the apparatus supplies, for example, ink to the ink jet head 2 through feed piping, not illustrated.

The ink jet head 2 performs a recording task by ejecting ink from nozzles and attaching the ejecting ink to a recording medium 10. In this embodiment, the ink jet head 2 is a serial ink jet head: it attaches ink to the recording medium 10 by making multiple scans relative to the recording medium 10 in a main scanning direction.

The ink jet head 2 is on the carriage 9, illustrated in FIG. 2. Driven by the carriage-moving mechanism 13, which moves the carriage 9 in the direction of medium width or along the width of the recording medium 10, the ink jet head 2 moves to make multiple scans relative to the recording medium 10 in the main scanning direction.

The direction of medium width is direction S1-S2 in FIG. 2 and is the main scanning direction, i.e., the main direction in which the ink jet head 2 moves. Scans in the main scanning direction are also referred to as main scans.

The ink jet head 2 can perform its ejection task based on any known technology. In this embodiment, the ink jet head 2 ejects droplets using vibrations of piezoelectric elements, i.e., forms ink droplets through mechanical deformation of electrostrictive elements. The details of the configuration of the ink jet head 2, the carriage 9, and related components are discussed later herein.

The ink jet recording apparatus 1 has an IR heater 3 and a platen heater 4 for heating the recording medium 10 during the ejection of ink from the ink jet head 2, or for primary heating or primary drying. The heating of the recording medium 10 in an ink attachment step, described later, in this embodiment uses at least one of the IR heater 3 and platen heater 4.

The IR heater 3 heats the recording medium 10 from the ink jet head 2 side. This often causes the ink jet head 2, too, to be heated, but at the same time helps elevate the temperature of the recording medium 10 with less influence of its thickness than with heating from the back of the recording medium 10, for example with the platen heater 4. The platen heater 4, by contrast, heats the recording medium 10 from the side opposite the ink jet head 2, which means the ink jet head 2 is relatively unlikely to be heated.

The ink jet recording apparatus 1 may perform primary drying, which is the drying of the recording medium 10 by a primary drying mechanism that is any of the preheater 7, platen heater 4, IR heater 3, and aeration fan 8. The primary drying provides early acceleration of drying of ink attached to the recording medium 10.

The heating heater 5 dries and solidifies ink attached to the recording medium 10. This is referred to as secondary heating or secondary drying; that is, the heating heater 5 is a heater for secondary drying. The heating heater 5 heats the recording medium 10 with a recorded image thereon, causing the water, for example, in the ink to evaporate away quickly. The resin left in the ink forms ink film, and this ink film becomes firmly fixed on or adheres firmly to the recording medium 10. In this way, the heating heater 5 makes the ink jet recording apparatus 1 superior in film formation, allowing the apparatus to produce a good and high-quality image in a short time.

The ink jet recording apparatus 1 may have a cooling fan 6. The cooling fan 6 cools the ink dried on the recording medium 10, and this helps form an ink coating that adheres firmly to the recording medium 10.

The preheater 7 heats the recording medium 10 before ink is attached to the recording medium 10, ensuring the ink is attached to a heated recording medium 10. The aeration fan 8 helps dry ink and treatment liquid attached to the recording medium 10 efficiently, by sending air to the recording medium 10.

Under the carriage 9 are a platen 11 on which the recording medium 10 is transported, a carriage-moving mechanism 13 that moves the carriage 9 relative to the recording medium 10, and a transporter 14 that is a roller that transports the recording medium 10 in a sub-scanning direction. The carriage-moving mechanism 13 and the transporter 14 operate under the control of the control unit CONT.

In this embodiment, the ink jet head 2 moves as the carriage 9 moves, and ejects ink and treatment liquid and attach them to the recording medium 10 during this movement. The ink jet head 2 in this embodiment is moved in this way to make multiple scans relative to the recording medium 10 in the main scanning direction to perform recording.

The main scanning direction is the direction in which the carriage 9 moves with the ink jet head 2 thereon. In FIG. 1, the main scanning direction is the direction that crosses the direction of transport of the recording medium 10, or a sub-scanning direction, indicated by the arrow SS. In FIG. 2, the direction along the width of the recording medium 10, i.e., direction S1-S2, is the main scanning direction MS, and the direction of T1→T2 is the sub-scanning direction SS. One scan is a one-way scan in the main scanning direction MS, i.e., in one of directions S1 and S2 in the ink jet recording apparatus 1. A main scan, of the ink jet head 2, and a sub-scan, which is the transport of the recording medium 10, are repeated to produce a recording on the recording medium 10. The ink jet recording apparatus 1 in FIGS. 1 and 2 is therefore a serial printer.

Alternatively, the recording apparatus can be a line printer. A line printer uses a line head, which is a printhead extending at least as long as the recording width of the recording medium, i.e., the width within which a recording is to be made, and performs a recording task by making a single scan over a recording medium being transported. Simply preparing the ink jet head 2 as a line head makes the recording apparatus a line printer; a line head is one of ink jet heads. When this is the case, the drying mechanisms also extend at least as long as the recording width of the recording medium so that the recording medium can be dried across its recording width.

Figure 3:
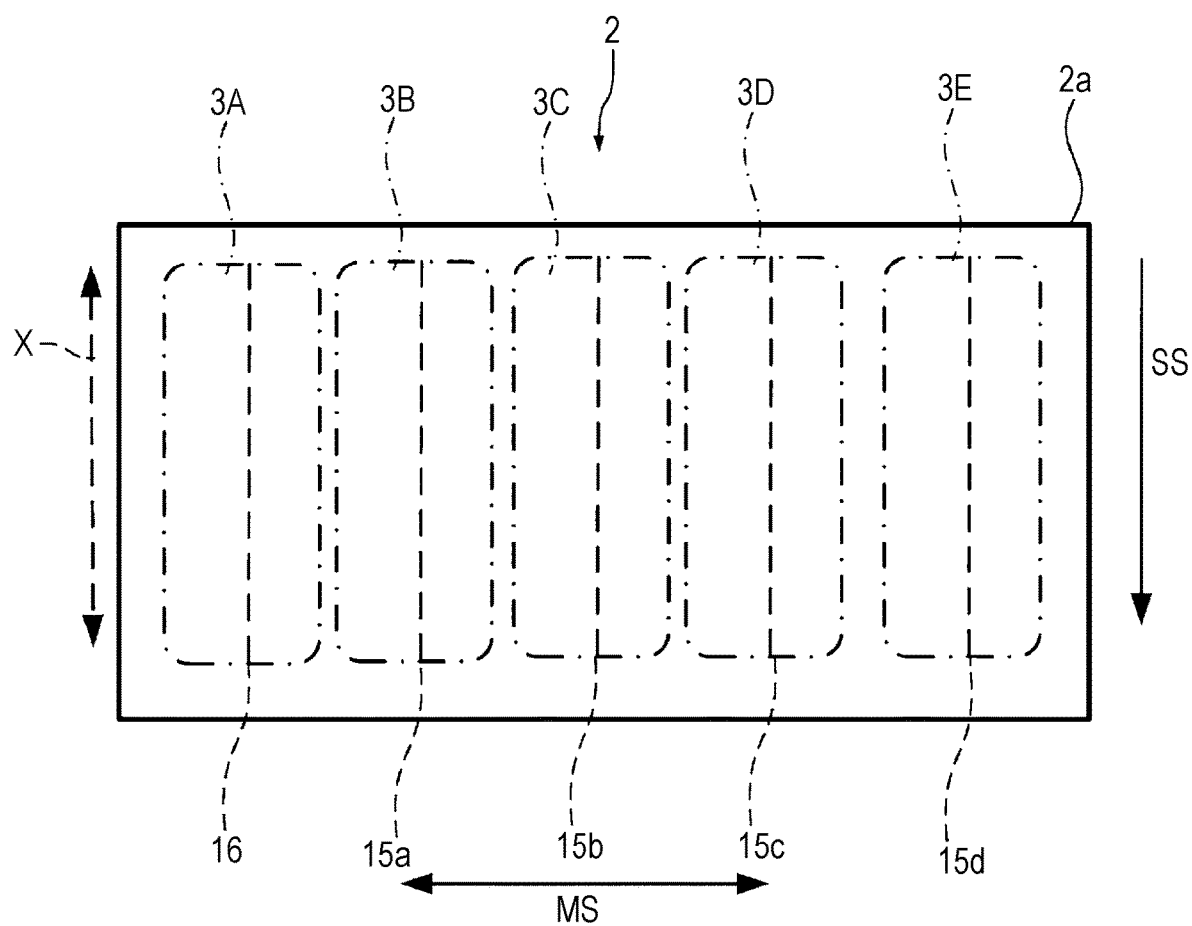
FIG. 3 is an outline bottom-view diagram schematically illustrating an exemplary arrangement of nozzle groups on an ink jet head.

FIG. 3 schematically illustrates an exemplary arrangement of nozzle groups on the nozzle surface 2a of an ink jet head 2. The ink jet head 2 has a nozzle surface 2a that includes multiple nozzles from which ink or treatment liquid is ejected. In the example illustrated in FIG. 3, the nozzle surface 2a of the ink jet head 2 has multiple groups of nozzles 16, 15a, 15b, 15c, and 15d lined up in the sub-scanning direction SS. A recording task can be performed using multiple inks by ejecting one ink from the nozzles in one nozzle group.

Ink jet attachment of a treatment liquid containing a flocculant to a recording medium can be achieved simply by assigning one of the multiple nozzle groups to the attachment of the treatment liquid, or by ejecting the treatment liquid from one nozzle group and attaching the ejected treatment liquid to the recording medium. In this case, the selected one nozzle group is the treatment liquid attachment mechanism.

In the example illustrated in FIG. 3, the nozzle group 16 is a treatment liquid nozzle group, a nozzle group from which treatment liquid is ejected. The nozzle groups 15a, 15b, 15c, and 15d, which are ink nozzle groups or nozzle groups from which inks are ejected, and the nozzle group 16, from which treatment liquid is ejected, have an overlap X in their position in the sub-scanning direction. The overlap X is the section of the nozzle surface 2a indicated by the double arrow with a broken line. When the regions 3A, 3B, 3C, 3D, and 3E, in which the nozzle groups 16, 15a, 15b, 15c, and 15d, respectively, are present, are projected in the main scanning direction MS, they overlap in this section in the sub-scanning direction SS.

The nozzle group 16, from which treatment liquid is ejected, only needs to have the overlap X in part. The nozzles groups 15a, 15b, 15c, and 15d, from which inks are ejected, only need to have the overlap X in part.

Such an overlap X allows treatment liquid and inks to be attached to a recording medium 10 simultaneously, or in the same scan, thereby enabling faster recording. Such an overlap X, moreover, advantageously helps reduce the size of the recording apparatus because it allows the ink jet head to be relatively short in the sub-scanning direction. The treatment liquid and ink nozzle groups are relatively close together, which means mist of the treatment liquid can easily adhere to the ink nozzles. However, the clogging of the nozzles is effectively prevented by virtue of the use of a treatment liquid and ink compositions according to this embodiment.

Although not illustrated, the treatment liquid and ink nozzle groups may be clearly separate in the sub-scanning direction. That is, the treatment liquid and ink nozzle groups may have no overlap in their position in the sub-scanning direction. In this case, it is possible to attach either the treatment liquid or the inks to the recording medium in one main scan, and then attach the rest to the same portion of the recording medium in another main scan. When one tries to reduce the length of the ink jet head in the sub-scanning direction, this arrangement is advantageous in that clogging is prevented more effectively because the treatment liquid and ink nozzle groups are relatively distant from each other and, therefore, mist of the treatment liquid does not easily adhere to the ink nozzles.

10. RECORDING METHOD

The recording method according to this embodiment uses a treatment liquid and an ink as described above. The method includes attaching the treatment liquid to a recording medium and attaching the ink to the recording medium.

11. RECORDING MEDIUM

The recording medium on which the image is formed in the recording method according to this embodiment may have a recording surface that absorbs liquids, such as the ink and treatment liquid, or may have no recording surface that absorbs liquids. The recording medium can therefore be of any type, including liquid-absorbing recording media, such as paper, film, and cloth, low-liquid-absorbing recording media, such as paper for commercial printing, and non-liquid-absorbing recording media, such as metal, glass, and polymers. However, the great advantages of the recording method according to this embodiment become more significant when the image is recorded on a low- or non-liquid-absorbing recording medium.

A low- or non-liquid-absorbing recording medium is a recording medium that absorbs little or no ink composition or treatment liquid. In quantitative terms, a non- or low-liquid-absorbing recording medium is a recording medium that absorbs 10 mL/m$^2$ or less water from the start of contact until 30 msec$^{1/2}$ in the Bristow test. The Bristow test is the most common method for brief measurement of liquid absorption and has also been adopted by Japan Technical Association of the Pulp and Paper Industry, or JAPAN TAPPI.

The details of the test method are set forth in No. 51 of "JAPAN TAPPI Test Method 2000," which specifies the Bristow test as a method for testing the absorption of liquid in paper and paperboards. A liquid-absorbing recording medium, on the other hand, is a recording medium that is not non- or low-liquid-absorbing. Being low- and non-liquid-absorbing may herein be referred to simply as low-absorbency and non-absorbent, respectively.

Examples of non-liquid-absorbing recording media include ones that have a plastic recording surface with no absorbing or receiving layer for absorbing the ink and treatment liquid thereon.

For example, a non-liquid-absorbing recording medium may be paper or any other substrate having a plastic coating, paper or any other substrate with a plastic film bonded thereto, or a plastic film having no absorbing or receiving layer. The plastic can be, for example, polyvinyl chloride, polyethylene terephthalate, polycarbonate, polystyrene, polyurethane, polyethylene, or polypropylene.

For low-liquid-absorbing recording media, examples include ones having a coating layer on their surface, called coated paper. Examples of paper-based ones include paper for commercial printing, such as art paper, coated paper, and matte paper. Examples of plastic-based ones include films of polyvinyl chloride, polyethylene terephthalate, polycarbonate, polystyrene, polyurethane, polyethylene, polypropylene, etc., with a coating, for example of a hydrophilic polymer, on their surface. Such films coated with particles, for example of silica or titanium, and a binder are also included.

The recording method according to this embodiment is suitable for use with flexible packaging film. Flexible packaging film is a type of non-liquid-absorbing recording medium. In more specific terms, flexible packaging film refers to highly flexible film materials for food packaging, packaging for toiletries and cosmetics, etc. Their surface is coated with, for example, an anti-fog and/or antistatic material and an antioxidant, and their thickness is from 5 to 70 μm, preferably from 10 to 50 μm.

Attaching treatment liquid or an ink composition to this type of film and fixing it on the film is more difficult than with a plastic film having an ordinary thickness. Even after successful fixation, the film is so flexible that the treatment liquid or ink composition cannot follow well when the film deforms, but rather often detaches. The recording method according to this embodiment, however, is highly suitable for the fixation of an ink composition on flexible packaging film.

Flexible packaging films that can be used include those having a recording surface made with at least one resin selected from olefin resins, such as polyethylene and polypropylene, ester resins, such as polyester, vinyl chloride resins, such as polyvinyl chloride, and amide resins, such as polyamide. A film or sheet made from any such resin can be used as the substrate, which includes the recording surface, of the flexible packaging film. A resin film or sheet can be of any type, such as a cast film or oriented film, for example uniaxially or biaxially oriented film. Preferably, a biaxially oriented film is used. Alternatively, films or sheets of such resins may be laminated together.

The recording method according to this embodiment is also suitable for use with a recording medium for sign graphics. As stated, recording media for sign graphics can be made of various materials ranging from banners, coated paper, matte paper, wallpaper, and cloth to PET, PVC, and other plastic films. The recording method according to this embodiment is particularly suitable for use with transparent or translucent plastic films such as for window display or car wrapping. Many of these films are based on a flexible substrate, for example of a polyolefin, PET, or PVC, and have an adhesive layer on the side opposite the print side. After printing, the adhesive side is attached, for example to a windowpane or the body of an automobile. Unfortunately, attaching treatment liquid or ink to this type of film and fixing it on the film is relatively difficult. Even after successful fixation, the film is so flexible that the treatment liquid or ink cannot follow well when the film deforms, but rather often detaches. The recording method according to this embodiment, however, is highly suitable for use with film for sign graphics.

Films for sign graphics that can be used include films whose recording surface is made with at least one resin selected from olefin resins, such as polyethylene and polypropylene, ester resins, such as polyester, vinyl chloride resins, such as polyvinyl chloride, and amide resins, such as polyamide.

The recording medium can be, for example, colorless and transparent, translucent, colored and transparent, colored and opaque, or colorless and opaque.

11.1. Attaching Treatment Liquid to the Recording Medium

The attachment of treatment liquid to the recording medium can be achieved by, for example, a direct or indirect contact technique, such as ink jet ejection and application of tiny droplets, roller coating with the treatment liquid, spray coating of the recording medium with the treatment liquid, dip coating of the recording medium with the treatment liquid, or the application of the treatment liquid using a brush or similar tool, or a combination thereof.

Ink jet attachment is advantageous in that it allows for easy control of how much and where to attach the treatment liquid; an appropriate amount of treatment liquid can be attached to an appropriate portion of the recording medium. When non-ink jet attachment is used, a possible method is to attach the treatment liquid, for example by any of the techniques listed above, before the attachment of the ink with an ink jet head, and then attach the ink to the recording medium with attached treatment liquid thereon.

11.2. Attaching Ink to the Recording Medium

The recording method according to this embodiment includes attaching ink to the recording medium. In the recording method according to this embodiment, multiple inks may be attached to the recording medium, with the proviso that at least one of the inks is an ink according to this embodiment as described above. Two or more inks according to this embodiment may be attached. The attachment of the ink to the recording medium is based on ink jet technology, or by ejecting the ink from an ink jet head.

As stated, the ink can be attached using a serial printer. When a line printer is used, the treatment liquid attachment mechanism is placed, for example, upstream of the ink-ejecting line head in the direction of transport of the recording medium. The treatment liquid is attached to the recording medium using this treatment liquid attachment mechanism, and then the ink is attached. The treatment liquid attachment mechanism may be a line head that ejects the treatment liquid.

In the recording method according to this embodiment, the ink may be dried with the aforementioned primary drying mechanism during attachment. Examples of primary drying mechanisms include a conduction drying mechanism, which comes into contact with and transfers heat to the recording medium like a platen roller, a radiation drying mechanism, which irradiates the recording medium with heat radiation like an IR radiator, and an air-blow drying mechanism, which blows air to the recording medium like a fan. One or two or more of such mechanisms can be used. The air for air-blow drying can be warm air or air at room temperature. Air at 45° C. or less is preferred in that it ensures stable ejection. Preferably, the temperature of the air is 40° C. or less, more preferably 38° C. or less, preferably 35° C. or less, preferably 30° C. or less, preferably 25° C. or less. There is no lower limit, but preferably the temperature of the air is 20° C. or more. Air at room temperature is preferred.

Whether primary drying is performed or not, the ink is attached to the recording medium preferably when the surface temperature of the recording medium is 45° C. or less, more preferably 40° C. or less, even more preferably 38° C. or less, in particular 35° C. or less, for the upper limit. As for the lower limit, the surface temperature of the recording medium is preferably 20° C. or more, preferably 25° C. or more, more preferably 28° C. or more, even more preferably 30° C. or more, in particular 32° C. or more. When the surface temperature does not exceed these upper limits, the recording medium receives little or no radiant heat from the primary drying mechanism. Such a surface temperature therefore advantageously leads to reduced clogging even when the ink and the treatment liquid come into contact near the nozzles of the ink jet head. A surface temperature of the recording medium not falling below these lower limits advantageously leads to higher image quality. It should be noted that the surface temperature of the recording medium represents the highest surface temperature that the portion of the recording medium facing the ink jet head reaches during the ink attachment step.

11.3. Postheating Step

As mentioned above, the recording medium may be heated after the attachment of the treatment liquid and ink. Any heating mechanism can be used, but an example is one or two or more selected from, for example, the aforementioned conduction, radiation, and air-blow mechanisms.

Preferably, the postheating step is performed at a temperature higher than the glass transition temperature of the resin particles contained in the ink. This advantageously leads to greater abrasion resistance.

In the postheating step, the recording medium is heated preferably to 120° C. or less, more preferably 100° C. or less, even more preferably 90° C. or less. As for the lower limit, the surface temperature of the recording medium reached is preferably 60° C. or more, more preferably 70° C. or more, even more preferably 80° C. or more.

A temperature of the recording medium in any of these ranges helps ensure that the resin particles will form a flat film in the recording, and also helps the resulting image to dry and become fixed more firmly to the recording medium. Heating at such a temperature also helps improve the gloss of the image by melting the resin particles and other components of the ink. This temperature is the highest temperature reached in the secondary heating step.

11.4. Amount of Ink Attached

In the ink attachment step, the maximum amount of ink attached per unit area of the recording medium is preferably from 5 to 30 mg/inch$^2$, preferably from 7 to 20 mg/inch$^2$, preferably from 10 to 15 mg/inch$^2$. This is advantageous in that it helps record a deeply expressive and highly useful image, and that image quality is better.

11.5. Amount of Treatment Liquid Attached

Preferably, the amount of treatment liquid attached is from 5% to 50% by mass, more preferably from 10% to 40% by mass, even more preferably from 15% to 30% by mass of the amount of ink attached in the recording area with the largest amount of attached ink. This advantageously leads to higher image quality, greater abrasion resistance, and more effective prevention of clogging.

Preferably, the distance between the nozzle surface and the surface of the recording medium in the ink attachment step is 0.5 mm or more, preferably 1 mm or more, more preferably 1.5 mm or more, and preferably is 3 mm or less, more preferably 2 mm or less, even more preferably 1.5 mm or less. This distance can be adjusted simply by tuning the distance from the ink jet head to the recording medium or the distance from the platen to the ink jet head. When this distance does not exceed these upper limits, the deviation of ink from the intended impact points is smaller. Such a nozzle-to-medium distance therefore advantageously leads to improved image quality. When this distance does not fall below these lower limits, the nozzles are less exposed to the impact of heat from the recording medium. Such a nozzle-to-medium distance therefore advantageously leads to more effective prevention of clogging. The recording medium can accidentally float up during a recording task, but setting a long nozzle-to-medium distance also helps reduce the risk that the recording medium will touch the nozzles and affect the prevention of clogging.

12. EXAMPLES

The following describes an embodiment of the present disclosure in further detail by providing examples. This embodiment, however, is not limited to these Examples.

12.1. Preparation of Treatment Liquids and Inks

Treatment liquids and inks were obtained by putting ingredients into a container according to the formula in Table 1, mixing them by stirring with a magnetic stirrer for 2 hours, and then filtering the mixture through a 5-μm membrane filter. The values in Table 1 are in % by mass.

The pigment dispersions and resins used to prepare the inks were as in Table 2. As shown in Table 2, the inks were made with different types and amounts of pigment dispersions and resins. The combined amount of pigment and dispersant resin and the resin content, i.e., the amount of resin particles or water-soluble resin, on a solids basis were set as in Table 2 by adjusting the amounts of pigment dispersion and resin used. For the ink made with pigment dispersion 2, the percentage is of solid pigment alone. The details of the pigment dispersions and resins are given below.

TABLE 1

| | Ingredients | Ink | Treatment liquid 1 | Treatment liquid 2 | Treatment liquid 3 | Treatment liquid 4 | Treatment liquid 5 | Treatment liquid 6 | Treatment liquid 7 | Treatment liquid 8 | Treatment liquid 9 | Treatment liquid 10 |
|---|---|---|---|---|---|---|---|---|---|---|---|---|
| | Pigment dispersion | Table 2 | — | — | — | — | — | — | — | — | — | — |
| | Add-in resin | Table 2 | — | — | — | — | — | — | — | — | — | — |
| Flocculant | Mg sulfate heptahydrate | — | 6 | — | — | — | — | — | — | — | 3 | 9 |
| | Ca propionate | — | — | 6 | — | — | — | — | — | — | — | — |
| | Ca nitrate | — | — | — | 6 | — | — | — | — | — | — | — |
| | Ca acetate | — | — | — | — | 6 | — | — | — | — | — | — |
| | Na sulfate | — | — | — | — | — | 6 | — | — | — | — | — |
| | PD-7 | — | — | — | — | — | — | 6 | — | — | — | — |
| | PD-30 | — | — | — | — | — | — | — | 6 | — | — | — |
| | Succinic acid | — | — | — | — | — | — | — | — | 6 | — | — |
| Organic solvents | 2-Pyrrolidone | 15 | 15 | 15 | 15 | 15 | 15 | 15 | 15 | 15 | 15 | 15 |
| | 1,3-Butanediol | 6 | 6 | 6 | 6 | 6 | 6 | 6 | 6 | 6 | 6 | 6 |
| | 1,2-Hexanediol | 6 | 3 | 3 | 3 | 3 | 3 | 3 | 3 | 3 | 3 | 3 |
| Surfactant | BYK-348 | 2 | 2 | 2 | 2 | 2 | 2 | 2 | 2 | 2 | 2 | 2 |
| | Purified water | Balance | Balance | Balance | Balance | Balance | Balance | Balance | Balance | Balance | Balance | Balance |
| | Total | 100 | 100 | 100 | 100 | 100 | 100 | 100 | 100 | 100 | 100 | 100 |

In Table 1, the details of the materials not identified by compound name are as follows.

Catiomaster PD-30, trade name: a resin produced by amine-epichlorohydrin condensation, Yokkaichi Chemical, Co., Ltd.

Catiomaster PD-7, trade name: a resin produced by amine-epichlorohydrin condensation, Yokkaichi Chemical, Co., Ltd.

BYK-348, trade name: a silicone surfactant, BYK Japan KK

TABLE 2

| | | Solid resin content (wt %), pigment + dispersant | | Add-in | Volume-average particle diameters for ink (nm) | | |
|---|---|---|---|---|---|---|---|
| Ink No. | Pigment dispersion | | Add-in resin | Solid add-in resin content (wt %) | resin/pigment ratio by mass (times) | Before mixing | Mixture | Ratio of increase (times) |
| Ink 1 | Pigment dispersion 1 | 0.5 | Resin particles 1 | 4 | 10.7 | 198 | 2098 | 10.6 |
| Ink 2 | Pigment dispersion 1 | 2 | Resin particles 1 | 6 | 4.0 | 121 | 2153 | 17.8 |
| Ink 3 | Pigment dispersion 1 | 2 | Resin particles 1 | 2 | 1.3 | 96 | 2954 | 30.8 |
| Ink 4 | Pigment dispersion 1 | 2 | Resin particles 1 | 1 | 0.7 | 178 | 3439 | 19.3 |
| Ink 5 | Pigment dispersion 1 | 2 | Resin particles 1 | 4 | 2.7 | 193 | 4671 | 24.2 |
| Ink 6 | Pigment dispersion 1 | 4 | Resin particles 1 | 4 | 1.3 | 93 | 4714 | 50.7 |
| Ink 7 | Pigment dispersion 1 | 6 | Resin particles 1 | 4 | 0.9 | 114 | 5925 | 52.0 |
| Ink 8 | Pigment dispersion 1 | 2 | Resin particles 2 | 6 | 4.0 | 115 | 5364 | 46.6 |
| Ink 9 | Pigment dispersion 2 | 2 | Resin particles 1 | 4 | 2.7 | 182 | 2157 | 11.9 |
| Ink 10 | Pigment dispersion 3 | 2 | Resin particles 1 | 4 | 2.7 | 111 | 111 | 1.0 |
| Ink 11 | Pigment dispersion 4 | 2 | Resin particles 1 | 4 | 2.7 | 78 | 92 | 1.2 |
| Ink 12 | Pigment dispersion 1 | 0.02 | Resin particles 1 | 4 | 266.7 | 207 | 238 | 1.1 |

TABLE 2-continued

| Ink No. | Pigment dispersion | Solid resin content (wt %), pigment + dispersant | Add-in resin | Solid add-in resin content (wt %) | Add-in resin/pigment ratio by mass (times) | Volume-average particle diameters for ink (nm) | | |
|---|---|---|---|---|---|---|---|---|
| | | | | | | Before mixing | Mixture | Ratio of increase (times) |
| Ink 13 | Pigment dispersion 1 | 0.1 | Resin particles 1 | 4 | 53.3 | 201 | 310 | 1.5 |
| Ink 14 | Pigment dispersion 1 | 0.4 | Resin particles 1 | 4 | 13.3 | 188 | 1625 | 8.6 |
| Ink 15 | Pigment dispersion 1 | 1 | Resin particles 1 | 6 | 8.0 | 145 | 1852 | 12.8 |
| Ink 16 | Pigment dispersion 1 | 2 | Resin particles 1 | 8 | 5.3 | 181 | 509 | 2.8 |
| Ink 17 | Pigment dispersion 1 | 2 | Water-soluble resin 1 | 4 | 2.7 | 108 | 4125 | 38.2 |
| Ink 18 | Pigment dispersion 1 | 2 | Water-soluble resin 2 | 4 | 2.7 | 108 | 6421 | 59.5 |
| Ink 19 | Pigment dispersion 1 | 2 | Resin particles 3 | 4 | 2.7 | 115 | 6102 | 53.1 |

Pigment Dispersion 1

A styrene-acrylic dispersant resin was prepared. Styrene, acrylic acid, and acrylate monomers were mixed, and 40 parts by mass of the mixture was added to a mixture of 7 parts by mass of potassium hydroxide, 23 parts by mass of water, and 30 parts by mass of triethylene glycol mono-n-butyl ether. The resulting mixture was heated at 80° C. with stirring, giving dispersant resin 1. The acid value of the resulting resin was set to 150 mg KOH/g.

A mixture was prepared by mixing 20 parts by mass of the cyan pigment C.I. Pigment Blue 15:3, 6.67 parts by mass of dispersant resin 1, 10 parts by mass of 1,3-butanediol, and 60 parts by mass of deionized water. The pigment was dispersed using a zirconium bead mill, giving pigment dispersion 1 as a liquid dispersion of pigment in cyan.

The volume-average diameter of particles in pigment dispersion 1 as measured by the method described above was 170 nm. The measuring instrument was Microtrac-BEL's Nanotrac Wave II EX150. Then a 6% by mass aqueous solution of magnesium sulfate heptahydrate was prepared as test solution, mixed with pigment dispersion 1, and the volume-average diameter of particles in the mixture was measured by the method described above. The ratio of the volume-average diameter of particles in the mixture to that before mixing was 38 times.

Pigment Dispersion 2

Dispersant resin 2 was obtained in the same way as dispersant resin 1 but with less acrylic acid. The acid value of the dispersant resin was 50 mg KOH/g. Pigment dispersion 2 was prepared in the same way as pigment dispersion 1, using dispersant resin 2 instead of dispersant resin 1. The volume-average diameter of particles in pigment dispersion 2 as measured by the method described above was 152 nm. Pigment dispersion 2 was mixed with the test solution, and the volume-average diameter of particles in the mixture was measured by the method described above. The ratio of the volume-average diameter of particles in the mixture to that before mixing was 21 times.

Pigment Dispersion 3

Dispersant resin 3 was obtained as a styrene-acrylic resin without acrylic acid. The acid value of the dispersant resin was 0 mg KOH/g. Pigment dispersion 3 was prepared as a liquid dispersion of pigment coated with dispersant resin 3. The volume-average diameter of particles in pigment dispersion 3 as measured by the method described above was 90 nm. Pigment dispersion 3 was mixed with the test solution, and the volume-average diameter of particles in the mixture was measured by the method described above. The ratio of the volume-average diameter of particles in the mixture to that before mixing was 1 time.

Pigment Dispersion 4

A polyethylene resin was prepared as dispersant resin 4. Pigment dispersion 4 was obtained as a liquid dispersion of pigment coated with dispersant resin 4. The volume-average diameter of particles in pigment dispersion 4 as measured by the method described above was 57 nm. Pigment dispersion 4 was mixed with the test solution, and the volume-average diameter of particles in the mixture was measured by the method described above. The ratio of the volume-average diameter of particles in the mixture to that before mixing was 1.1 times.

Resin Particles 1

Resin particles 1 were obtained as an emulsion of a styrene-acrylic resin by copolymerizing styrene and acrylate monomers by emulsification polymerization. The surfactant for emulsification polymerization was Nippon Nyukazai Co., Ltd.'s Newcol NT-30, and its amount was 5 parts by mass in a total of 100 parts by mass of the monomers. The acid value of resin particles 1 was set to 0 mg KOH/g. The volume-average diameter of resin particles 1 as measured by the method described above was 200 nm. Pigment particles 1 were mixed with the test solution, and the volume-average diameter of particles in the mixture was measured by the method described above. The ratio of the volume-average diameter of particles in the mixture to that before mixing was 1 time.

Resin Particles 2

Resin particles 2 were prepared in the same way as resin particles 1 but using acrylic acid as an additional monomer. The amount of emulsifier was 2 parts by mass in a total of 100 parts by mass of the monomers.

The acid value of resin particles 2 was set to 15 mg KOH/g. The volume-average diameter of resin particles 2 as measured by the method described above was 95 nm. Pigment particles 2 were mixed with the test solution, and the volume-average diameter of particles in the mixture was measured by the method described above. The ratio of the volume-average diameter of particles in the mixture to that before mixing was 1.2 times.

Resin Particles 3

Resin particles 3 were prepared in the same way as resin particles 2 but with more acrylic acid. The amount of emulsifier was 1 part by mass in a total of 100 parts by mass of the monomers.

The acid value of resin particles 3 was set to 50 mg KOH/g. The volume-average diameter of resin particles 3 as measured by the method described above was 95 nm. Pigment particles 3 were mixed with the test solution, and the volume-average diameter of particles in the mixture was measured by the method described above. The ratio of the volume-average diameter of particles in the mixture to that before mixing was 5 times.

Water-Soluble Resin 1

A urethane resin was prepared as water-soluble resin 1. Mixing an aqueous solution of this resin with the test solution in the way as described above caused a reaction that made the liquid turbid.

Water-Soluble Resin 2

Polyethylene glycol was prepared as water-soluble resin 2. Mixing an aqueous solution of this resin with the test solution in the way as described above caused no change.

For each of the resulting inks, the volume-average diameter of particles was measured by the method described above. Each ink was mixed with the test solution, and the volume-average diameter of particles in the mixture was measured by the method described above. The measured diameters are summarized in Table 2, along with the ratio of increase in the volume-average diameter of particles from the ink before mixing to the mixture.

13. RECORDING TEST

The recording apparatus was a modified version of Seiko Epson Corporation's ink jet printer sold under the trade name of SC-580650. SC-580650 is a serial printer; it performs recording by alternating main scans and the transport of a recording medium as sub-scans. The nozzle density of its nozzle groups was 800 dpi, and each nozzle group consisted of 800 nozzles. A primary drying mechanism was provided as in FIG. 1, and the recording medium was Mactac's Mactac 5829R. A solid pattern was produced by attaching 10 mg/inch$^2$ of ink. The amount of treatment liquid attached was 40% by mass of that of ink. Recording with the ink was by four-pass printing.

The primary drying mechanism was set up to ensure the surface temperature of the recording medium during the attachment of the ink would be the attachment temperature given in the table. After attachment, the recording medium was dried at a surface temperature of 70° C. with a secondary drying mechanism placed downstream of the head in the direction of transport of the recording medium. Recording examples were performed using the following treatment liquid attachment methods and primary drying mechanism configurations. The vertical position of the head was adjusted to set the distance between the nozzle surface of the head and the portion of the recording medium facing it to the value in the table. The test methods are described below. The treatment liquid, ink, and test results by recording example are presented in Tables 3 to 5.

Treatment Liquid Attachment Methods

Method 1:

The nozzle groups on the head were arranged as in FIG. 3. The nozzle group 16 was loaded with the treatment liquid, and the nozzle group 15a was loaded with the ink. The treatment liquid and ink nozzle groups had an overlap in the sub-scanning direction when projected in the main scanning direction. The treatment liquid and the ink were attached to the same portion of the recording medium in the same main scan.

Method 2:

In FIG. 3, the nozzle group 16 was downstream of the other nozzle groups in the sub-scanning direction SS. The treatment liquid and ink nozzle groups therefore had no overlap in the sub-scanning direction when projected in the main scanning direction. The nozzle surface was approximately twice as long as in FIG. 3 in the sub-scanning direction. The length of each nozzle group was the same as in FIG. 3. The treatment liquid was attached by four-pass printing first, and then the ink was attached by four-pass printing to the pattern of attached treatment liquid.

Primary Drying Mechanisms

Mechanism 1:

The aeration fan 8 in FIG. 1 was operated to send air at room temperature, or 25° C., to the recording medium. The platen heater setting was also adjusted, to warm the surface of the recording medium to the temperature in the table. Air served as an extra drying tool for the ink attached to the recording medium.

Mechanism 2:

With the aeration fan off, the platen heater was operated to warm the surface of the recording medium to the temperature in the table. The platen heater served as the only drying tool for the ink attached to the recording medium.

Mechanism 3:

The primary drying mechanism was not used; the aeration fan was not operated, and the platen heater was turned off.

TABLE 3

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Ink No. | Ink 1 | Ink 2 | Ink 3 | Ink 4 | Ink 5 | Ink 6 | Ink 7 | Ink 8 | Ink 9 | Ink 5 | Ink 5 |
| Treatment liquid No. | Treatment liquid 1 | Treatment liquid 1 | Treatment liquid 1 | Treatment liquid 1 | Treatment liquid 1 | Treatment liquid 1 | Treatment liquid 1 | Treatment liquid 1 | Treatment liquid 1 | Treatment liquid 2 | Treatment liquid 3 |
| Treatment liquid attachment method | Method 1 | Method 1 | Method 1 | Method 1 | Method 1 | Method 1 | Method 1 | Method 1 | Method 1 | Method 1 | Method 1 |
| Primary drying mechanism | Mechanism 1 | Mechanism 1 | Mechanism 1 | Mechanism 1 | Mechanism 1 | Mechanism 1 | Mechanism 1 | Mechanism 1 | Mechanism 1 | Mechanism 1 | Mechanism 1 |
| Attachment temperature (° C.) | 35 | 35 | 35 | 35 | 35 | 35 | 35 | 35 | 35 | 35 | 35 |
| Distance to the recording medium (mm) | 1.5 | 1.5 | 1.5 | 1.5 | 1.5 | 1.5 | 1.5 | 1.5 | 1.5 | 1.5 | 1.5 |
| Clogging | C | B | A | A | B | A | A | C | C | B | B |
| Image quality (bleeds) | A | A | A | A | A | A | B | A | B | A | A |
| Paper jam | B | B | A | A | A | A | A | B | B | A | A |
| Abrasion resistance | A | A | B | C | B | B | C | C | A | B | B |

TABLE 4

|  | Example 12 | Example 13 | Example 14 | Example 15 | Example 16 | Example 17 |
|---|---|---|---|---|---|---|
| Ink No. | Ink 5 | Ink 5 | Ink 5 | Ink 5 | Ink 5 | Ink 5 |
| Treatment liquid No. | Treatment liquid 4 | Treatment liquid 5 | Treatment liquid 6 | Treatment liquid 7 | Treatment liquid 8 | Treatment liquid 9 |
| Treatment liquid attachment method | Method 1 | Method 1 | Method 1 | Method 1 | Method 1 | Method 1 |
| Primary drying mechanism | Mechanism 1 | Mechanism 1 | Mechanism 1 | Mechanism 1 | Mechanism 1 | Mechanism 1 |
| Attachment temperature (° C.) | 35 | 35 | 35 | 35 | 35 | 35 |
| Distance to the recording medium (mm) | 1.5 | 1.5 | 1.5 | 1.5 | 1.5 | 1.5 |
| Clogging | B | B | C | C | C | A |
| Image quality (bleeds) | A | B | A | A | B | B |
| Paper jam | A | B | A | C | A | A |
| Abrasion resistance | B | A | A | A | A | A |

|  | Example 18 | Example 19 | Example 20 | Example 21 | Example 22 | Example 23 |
|---|---|---|---|---|---|---|
| Ink No. | Ink 5 | Ink 5 | Ink 5 | Ink 5 | Ink 5 | Ink 2 |
| Treatment liquid No. | Treatment liquid 10 | Treatment liquid 1 | Treatment liquid 1 | Treatment liquid 1 | Treatment liquid 1 | Treatment liquid 1 |
| Treatment liquid attachment method | Method 1 | Method 2 | Method 1 | Method 1 | Method 1 | Method 1 |
| Primary drying mechanism | Mechanism 1 | Mechanism 1 | Mechanism 2 | Mechanism 1 | Mechanism 3 | Mechanism 1 |
| Attachment temperature (° C.) | 35 | 35 | 35 | 40 | 25 | 35 |
| Distance to the recording medium (mm) | 1.5 | 1.5 | 1.5 | 1.5 | 1.5 | 3 |
| Clogging | C | A | C | C | A | B |
| Image quality (bleeds) | A | A | B | A | B | A |
| Paper jam | B | A | B | B | A | A |
| Abrasion resistance | C | A | B | B | B | B |

TABLE 5

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| Ink No. | Ink 10 | Ink 11 | Ink 12 | Ink 13 | Ink 14 | Ink 15 | Ink 16 | Ink 17 | Ink 18 | Ink 19 |
| Treatment liquid No. | Treatment liquid 1 | Treatment liquid 1 | Treatment liquid 1 | Treatment liquid 1 | Treatment liquid 1 | Treatment liquid 1 | Treatment liquid 1 | Treatment liquid 1 | Treatment liquid 1 | Treatment liquid 1 |
| Treatment liquid attachment method | Method 1 | Method 1 | Method 1 | Method 1 | Method 1 | Method 1 | Method 1 | Method 1 | Method 1 | Method 1 |
| Primary drying mechanism | Mechanism 1 | Mechanism 1 | Mechanism 1 | Mechanism 1 | Mechanism 1 | Mechanism 1 | Mechanism 1 | Mechanism 1 | Mechanism 1 | Mechanism 1 |
| Attachment temperature (° C.) | 35 | 35 | 35 | 35 | 35 | 35 | 35 | 35 | 35 | 35 |

TABLE 5-continued

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| Distance to the recording medium (mm) | 1.5 | 1.5 | 1.5 | 1.5 | 1.5 | 1.5 | 1.5 | 1.5 | 1.5 | 1.5 |
| Clogging | D | D | D | D | D | D | D | D | D | D |
| Image quality (bleeds) | C | C | A | A | A | A | A | A | A | A |
| Paper jam | D | D | D | D | D | D | D | D | D | D |
| Abrasion resistance | A | A | A | A | A | A | A | C | C | D |

Clogging Test

A test recording was performed continuously for 120 minutes by the recording method described above. After the recording, the ink nozzle group was inspected for failed ejection from the nozzles.

A: No nozzle failed to eject the ink, and the percentage of nozzles that attached ink droplets with a deviation equal to or larger than the nozzle pitch was 3% or less.

B: No nozzle failed to eject the ink, but the percentage of nozzles that attached ink droplets with a deviation equal to or larger than the nozzle pitch was more than 3%.

C: Nozzle(s) failed to eject the ink, but the percentage was 3% or less.

D: More than 3% of the nozzles failed to eject the ink.

Image Quality and Bleeds: Test for Uneven Shades

The pattern recorded in the test recording was visually inspected.

A: No ink bleed was observed in the pattern.

B: Some minor ink bleeds were observed in the pattern.

C: Major ink bleeds were observed in the pattern.

Paper Jam Test

The recording apparatus was configured to transport the recording medium accurately, by programming transporters upstream and downstream of the platen in the direction of transport to work together. In this test, the apparatus was tuned to make the downstream transporter transport the recording medium for a slightly shorter distance than the upstream transporter at regular intervals, causing the recording medium to float up to touch the nozzle surface. That is, a situation was intentionally created in which the recording medium would jam and touch the nozzle surface. In this situation, a test recording was performed continuously for 60 minutes. After the recording, the ink nozzle group was cleaned. The cleaning was by aspirating and draining 1 mL of ink per nozzle group and to resolve excessive clogging of the type that occurs when the recording medium touches the nozzle surface during a recording task. In such a situation the treatment liquid directly touches the ink nozzles, and the ink reacts with the treatment liquid there. After the cleaning, the nozzles were inspected for failed ejection.

A: All nozzles recovered after a round of cleaning, or no nozzle failed to eject the ink.

B: Not all nozzles recovered after a round of cleaning, but all recovered after two.

C: Not all nozzles recovered even after two rounds of cleaning, but all recovered after three.

D: Not all nozzles recovered even after three rounds of cleaning.

Abrasion Resistance Test

Using a color fastness rubbing tester, a Tester Sangyo Co., Ltd. product with the trade name of "AB-301," the surface of a pattern recorded in a test recording was rubbed 50 times under a load of 200 g with a friction finger with an attached piece of cotton fabric as in JIS L 0803. The image on the surface of the recording medium was visually inspected for peeling according to the criteria below.

A: The image did not peel.

B: The image peeled in 5% or less of the rubbed area.

C: The image peeled in more than 5% and 10% or less of the rubbed area.

D: The image peeled in more than 10% of the rubbed area.

Test Results

According to the test results, the Examples, which are examples of this embodiment, were superior in the prevention of clogging, the quality of the image, and the control of bleeds. The Comparative Examples, which are not examples of this embodiment, were all inferior in the prevention of clogging. The details are as follows.

When Examples 1 to 7 are compared, clogging was prevented more effectively with increasing proportion of pigment to resin particles in the ink. Abrasion resistance, however, was greater with decreasing proportion of pigment to resin particles in the ink When Examples 5 and 8 are compared, the prevention of clogging and abrasion resistance were better with smaller increases in volume-average particle diameter from resin particles to their mixture.

When Examples 5 and 9 are compared, the prevention of clogging and image quality were better with greater increases in volume-average particle diameter from pigment to its mixture.

When Examples 5 and 10 to 18 are compared, the use of a polyvalent metal salt as the flocculant in the treatment liquid led to higher image quality, and the use of a cationic resin led to greater abrasion resistance. Reducing or increasing the flocculant content of the treatment liquid did not affect the effective prevention of clogging and high quality of the image.

An overlap between treatment liquid and ink nozzle groups in the sub-scanning direction advantageously helps reduce the size of the apparatus because it allows the head to be shorter in the sub-scanning direction, but at the same time tends to cause more frequent clogging. When Examples 5 and 19 are compared, this embodiment provided effective prevention of clogging even with such an overlap.

When Examples 5 and 20 are compared, the use of an air-blow primary drying mechanism advantageously led to more effective prevention of clogging and higher image quality.

When Examples 5, 21, and 22 are compared, lower temperatures of the recording medium at ink attachment led to more effective prevention of clogging, and higher temperatures of the recording medium at ink attachment led to higher image quality.

A smaller distance to the recording medium is advantageous in that it leads to a smaller deviation of ink from the intended impact points, but at the same time tends to cause more frequent clogging because it heightens the risk that the recording medium will touch the nozzle surface. When Examples 5 and 23 are compared, this embodiment provided effective prevention of clogging even with a small nozzle-to-medium distance.

Comparative Examples 1 to 7, in which the volume-average diameter of particles in the ink mixture was less than 2000 nm, were inferior in the prevention of clogging.

Comparative Examples 8 and 9, in which the ink contained a water-soluble resin instead of resin particles, were inferior in the prevention of clogging.

Comparative Example 10, in which the volume-average diameter of particles in the ink mixture was more than 2000 nm, was inferior in the prevention of clogging.

The present disclosure is not limited to the above embodiments, and many variations are possible. For example, the present disclosure embraces configurations substantially identical to those described in the embodiments, such as configurations identical in function, methodology, and results to or having the same goal and offering the same advantages as the described ones.

The present disclosure also includes configurations created by changing any nonessential part of those described in the above embodiments.

Furthermore, the present disclosure encompasses configurations identical in operation and effect to or capable of fulfilling the same purposes as those described in the above embodiments. Configurations obtained by adding any known technology to those described in the embodiments are also part of the present disclosure.

What is claimed is:

1. An ink jet recording method comprising:
    a treatment liquid attachment step, in which a treatment liquid containing a flocculant is attached to a recording medium; and
    an ink attachment step, in which an ink composition containing a pigment and resin particles is attached to the recording medium by ejecting the ink composition from an ink jet head,
    wherein the pigment includes pigment particles having a volume-average diameter in the range of 10 nm to 300 nm,
    the resin particles have a volume-average diameter in the range of 10 nm to 300 nm,
    when the pigment is mixed with a 6% by mass aqueous solution of magnesium sulfate heptahydrate, a ratio of increase in the volume-average diameter of the pigment particles is 10 times or more in comparison to the volume-average diameter of the figment particles before mixing,
    when the resin particles are mixed with a 6% by mass aqueous solution of magnesium sulfate heptahydrate, a ratio of increase in the volume-average diameter of the resin particles is 2 times or less in comparison to the volume-average diameter of the resin particles before mixing, and
    wherein when the ink composition is mixed in a 1:1 ratio by mass with a 6% by mass aqueous solution of magnesium sulfate heptahydrate, a total volume-average diameter of the pigment particles and the resin particles in the mixture is from 2000 to 6000 nm.

2. The ink jet recording method according to claim 1, wherein a resin particle content of the ink composition is from 0.9 to 13 times a pigment content.

3. The ink jet recording method according to claim 1, wherein when the pigment is mixed with the 6% by mass aqueous solution of magnesium sulfate heptahydrate, the ratio of increase in the volume-average diameter of the pigment particles is 20 times or more in comparison to the volume-average diameter of the pigment particles before mixing, and
    when the resin particles are mixed with the 6% by mass aqueous solution of magnesium sulfate heptahydrate, the ratio of increase in the volume-average diameter of the resin particles is 1.5 times or less in comparison to the volume-average diameter of the resin particles before mixing.

4. The ink jet recording method according to claim 1, wherein the flocculant, contained in the treatment liquid, is any of a cationic polymer, a metal salt, and an organic acid.

5. The ink jet recording method according to claim 1, wherein a pigment content is from 0.5% to 5% by mass of a total mass of the ink composition, and a resin particle content is from 1% to 15% by mass of the total mass of the ink composition.

6. The ink jet recording method according to claim 1, wherein when the ink composition is mixed in the 1:1 ratio by mass with the 6% by mass aqueous solution of magnesium sulfate heptahydrate, a ratio of increase in the total volume-average diameter of the pigment particles and the resin particles in the ink composition is 10 to 60 times the total volume average diameter of the pigment particles and the resin particles before mixing.

7. The ink jet recording method according to claim 1, wherein a surface temperature of a portion of the recording medium facing the ink jet head in the ink attachment step is 40° C. or less.

8. The ink jet recording method according to claim 1, wherein in the ink attachment step, the ink composition attached to the recording medium is dried using an air-blow drying mechanism.

9. The ink jet recording method according to claim 1, wherein the treatment liquid attachment step is performed by attaching the treatment liquid to the recording medium by ejecting the treatment liquid from the ink jet head; and
    a treatment liquid nozzle group, which is a group of nozzles that eject the treatment liquid, and an ink nozzle group, which is a group of nozzles that eject the ink composition, have an overlap in a sub-scanning direction when projected in a main scanning direction.

10. The ink jet recording method according to claim 1, wherein in the ink attachment step, a distance between a nozzle surface of an ink nozzle group and a surface of the recording medium when the ink composition is ejected is 3 mm or less.

11. The ink jet recording method according to claim 1, wherein in the ink attachment step the ink composition attached to the recording medium is dried using an air-blow drying mechanism, and a temperature of the air emitted by the air-blow drying mechanism is 30 degrees C. or less.

12. An ink set comprising an ink composition and a treatment liquid;
    the ink set being for use in an ink jet recording method performed by attaching the treatment liquid to a recording medium and attaching the ink composition to the recording medium by ejecting the ink composition from an ink jet head, wherein:

the treatment liquid contains a flocculent;

the ink composition contains a pigment and resin particles;

the pigment includes pigment particles having a volume-average diameter in the range of 10 nm to 300 nm;

the resin particles have a volume-average diameter in the range of 10 nm to 300 nm;

when the pigment is mixed with a 6% by mass aqueous solution of magnesium sulfate heptahydrate, a ratio of increase in the volume-average diameter of the pigment particles is 10 times or more in comparison to the volume-average diameter of the pigment particles before mixing;

when the resin particles are mixed with a 6% by mass aqueous solution of magnesium sulfate heptahydrate, a ratio of increase in the volume-average diameter of the resin particles is 2 times or less in comparison to the volume-average diameter of the resin particles before mixing; and when the ink composition is mixed in a 1:1 ratio by mass with a 6% by mass aqueous solution of magnesium sulfate heptahydrate, a total volume-average diameter of the pigment particles and the resin particles in the mixture is from 2000 to 6000 nm.

13. An ink jet recording apparatus comprising:

a treatment liquid attachment mechanism, which attaches a treatment liquid containing a flocculent to a recording medium; and an ink jet head, which attaches an ink composition containing a pigment and resin particles to the recording medium by ejecting the ink composition, wherein the pigment includes pigment particles having a volume-average diameter in the range of 10 nm to 300 nm;

the resin particles have a volume-average diameter in the range of 10 nm to 300 nm;

when the pigment is mixed with a 6% by mass aqueous solution of magnesium sulfate heptahydrate, a ratio of increase in the volume-average diameter of the pigment particles is 10 times or more in comparison to the volume-average diameter of the pigment particles before mixing;

when the resin particles are mixed with a 6% by mass aqueous solution of magnesium sulfate heptahydrate, a ratio of increase in the volume-average diameter of the resin particles is 2 times or less in comparison to the volume-average diameter of the resin particles before mixing; and when the ink composition is mixed in a 1:1 ratio by mass with a 6% by mass aqueous solution of magnesium sulfate heptahydrate, a total volume-average diameter of the pigment particles and the resin particles in the mixture is from 2000 to 6000 nm.

* * * * *